US00RE44758E

(19) United States
(12) Reissued Patent
Allen et al.

(10) Patent Number: US RE44,758 E
(45) Date of Reissued Patent: Feb. 11, 2014

(54) OPTICAL FIBER INTERCONNECT CABINETS, TERMINATION MODULES AND FIBER CONNECTIVITY MANAGEMENT FOR THE SAME

(75) Inventors: Barry W. Allen, Siler City, NC (US); Douglas F. Dowling, Cary, NC (US); Jack A. Smith, Jr., Garner, NC (US)

(73) Assignee: ADC Telecommunications, Inc., Berwyn, PA (US)

(21) Appl. No.: 12/592,274

(22) Filed: Nov. 20, 2009

Related U.S. Patent Documents

Reissue of:

(64) Patent No.: 7,298,952
Issued: Nov. 20, 2007
Appl. No.: 11/584,068
Filed: Oct. 20, 2006

U.S. Applications:

(63) Continuation of application No. 10/799,328, filed on Mar. 12, 2004, now Pat. No. 7,142,764.

(60) Provisional application No. 60/456,323, filed on Mar. 20, 2003.

(51) Int. Cl.
*G02B 6/00* (2006.01)

(52) U.S. Cl.
USPC ..... 385/135; 385/134

(58) Field of Classification Search
USPC ..... 385/135
See application file for complete search history.

(56) References Cited

U.S. PATENT DOCUMENTS

| | | | |
|---|---|---|---|
| 4,630,886 | A | 12/1986 | Lauriello et al. |
| 4,736,100 | A | 4/1988 | Vastagh |
| 4,747,020 | A | 5/1988 | Brickley et al. |
| 4,765,710 | A | 8/1988 | Burmeister et al. |
| 4,792,203 | A | 12/1988 | Nelson et al. |
| 4,824,196 | A | 4/1989 | Bylander |
| 4,861,134 | A | 8/1989 | Alameel et al. |
| 4,900,123 | A | 2/1990 | Barlow et al. |
| 4,913,522 | A | 4/1990 | Nolf et al. |
| 4,948,220 | A | 8/1990 | Violo et al. |
| 4,995,688 | A | 2/1991 | Anton et al. |

(Continued)

FOREIGN PATENT DOCUMENTS

| | | | |
|---|---|---|---|
| CN | 2426610 | Y | 4/2001 |
| DE | 42 07 531 | A1 | 9/1992 |

(Continued)

OTHER PUBLICATIONS

Tyco Electronics Fiber Optic Division, Catalog 1307895, Issue 5-00, pp. 217-219.

(Continued)

*Primary Examiner* — Ryan Lepisto
(74) *Attorney, Agent, or Firm* — Merchant & Gould P.C.

(57) ABSTRACT

Interconnect cabinets for optical fibers include an enclosure and a splitter and termination panel mounted in the enclosure. The splitter has a plurality of optical fiber-connectorized pigtails extending therefrom. Each of the connectorized pigtails is associated with an optical fiber feeder cable to be coupled to a central office. The termination panel has a plurality of optical fiber connection members, ones of which are associated with respective subscriber locations. The connectorized pigtails have a cable length sufficient to allow connection to the plurality of connection members.

21 Claims, 12 Drawing Sheets

(56) References Cited

U.S. PATENT DOCUMENTS 5,023,646 A 6/1991 Ishida et al.
5,058,983 A 10/1991 Corke et al.
5,073,042 A 12/1991 Mulholland et al.
5,076,688 A 12/1991 Bowen et al.
5,100,221 A 3/1992 Carney et al.
5,129,030 A 7/1992 Petrunia
5,142,598 A 8/1992 Tabone
5,179,618 A 1/1993 Anton
5,214,735 A 5/1993 Henneberger et al.
5,233,674 A 8/1993 Vladic
5,274,729 A 12/1993 King et al.
5,274,731 A 12/1993 White
5,289,558 A 2/1994 Teichler et al.
5,317,663 A 5/1994 Beard et al.
5,333,221 A 7/1994 Briggs et al.
5,333,222 A 7/1994 Belenkiy et al.
5,359,688 A 10/1994 Underwood
5,363,465 A 11/1994 Korkowski et al.
5,367,598 A 11/1994 Devenish, III et al.
5,402,515 A 3/1995 Vidacovich et al.
5,408,557 A 4/1995 Hsu
RE34,955 E 5/1995 Anton et al.
5,420,958 A 5/1995 Henson et al.
5,432,875 A 7/1995 Korkowski et al.
5,442,726 A 8/1995 Howard et al.
5,448,015 A 9/1995 Jamet et al.
5,469,526 A 11/1995 Rawlings
5,497,444 A 3/1996 Wheeler
5,506,922 A 4/1996 Grois et al.
5,511,144 A 4/1996 Hawkins et al.
5,542,015 A 7/1996 Hultermans
5,636,138 A 6/1997 Gilbert et al.
5,640,482 A 6/1997 Barry et al.
5,647,043 A 7/1997 Anderson et al.
5,689,604 A 11/1997 Janus et al.
5,708,751 A 1/1998 Mattei
5,715,348 A 2/1998 Falkenberg et al.
5,717,810 A 2/1998 Wheeler
5,734,776 A 3/1998 Puetz
5,758,002 A 5/1998 Walters
5,758,003 A 5/1998 Wheeler et al.
5,764,844 A 6/1998 Mendes
5,774,245 A 6/1998 Baker
5,774,612 A 6/1998 Belenkiy et al.
5,778,132 A 7/1998 Csipkes et al.
5,784,515 A 7/1998 Tamaru et al.
5,823,646 A 10/1998 Arizpe et al.
5,825,955 A 10/1998 Ernst et al.
5,825,962 A 10/1998 Walters et al.
5,883,995 A 3/1999 Lu
5,903,698 A 5/1999 Poremba et al.
5,909,526 A 6/1999 Roth et al.
5,913,006 A 6/1999 Summach
5,930,425 A 7/1999 Abel et al.
5,945,633 A 8/1999 Ott et al.
5,956,444 A 9/1999 Duda et al.
5,969,294 A 10/1999 Eberle et al.
5,975,769 A 11/1999 Larson et al.
6,027,252 A 2/2000 Erdman et al.
6,041,155 A 3/2000 Anderson et al.
6,044,193 A 3/2000 Szentesi et al.
6,061,492 A 5/2000 Strause et al.
6,069,797 A 5/2000 Widmayer et al.
6,076,975 A 6/2000 Roth
6,079,881 A 6/2000 Roth
6,149,315 A 11/2000 Stephenson
6,160,946 A 12/2000 Thompson et al.
6,181,862 B1 1/2001 Noble et al.
6,188,687 B1 2/2001 Mussman et al.
6,188,825 B1 2/2001 Bandy et al.
6,195,494 B1 2/2001 Abbott et al.
6,201,919 B1 3/2001 Puetz et al.
6,208,796 B1 3/2001 Williams Vigliaturo
6,227,717 B1 5/2001 Ott et al.
6,234,683 B1 5/2001 Waldron et al.
6,236,795 B1 5/2001 Rodgers
6,240,229 B1 5/2001 Roth
6,247,849 B1 6/2001 Liu
6,256,443 B1 7/2001 Uruno
6,256,444 B1 7/2001 Bechamps et al.
6,259,850 B1 7/2001 Crosby, Jr. et al.
6,271,484 B1 8/2001 Tokutsu
6,278,829 B1 8/2001 BuAbbud et al.
6,289,159 B1 9/2001 Van Hees et al.
6,307,998 B2 10/2001 Williams Vigliaturo
RE37,489 E 1/2002 Anton et al.
6,347,888 B1 2/2002 Puetz
6,356,697 B1 3/2002 Braga et al.
6,362,422 B1 3/2002 Vavrik et al.
6,363,200 B1 3/2002 Thompson et al.
6,385,381 B1 5/2002 Janus et al.
6,398,149 B1 6/2002 Hines et al.
6,411,767 B1 6/2002 Burrous et al.
6,418,262 B1 7/2002 Puetz et al.
6,424,781 B1 7/2002 Puetz et al.
6,425,694 B1 7/2002 Szilagyi et al.
6,427,035 B1 7/2002 Mahony
6,431,762 B1 8/2002 Taira et al.
6,434,313 B1 8/2002 Clapp, Jr. et al.
6,438,311 B1 8/2002 Zarnowitz
6,452,925 B1 9/2002 Sistanizadeh et al.
6,453,033 B1 9/2002 Little et al.
6,464,402 B1 10/2002 Andrews et al.
6,467,633 B1 10/2002 Mendoza
6,468,112 B1 10/2002 Follingstad et al.
D466,087 S 11/2002 Cuny et al.
6,480,487 B1 11/2002 Wegleitner et al.
6,483,977 B2 11/2002 Battey et al.
6,487,356 B1 11/2002 Harrison et al.
6,496,640 B1 12/2002 Harvey et al.
6,496,641 B1 * 12/2002 Mahony ..... 385/135
6,501,899 B1 12/2002 Marrs et al.
6,532,332 B2 3/2003 Solheid et al.
6,535,682 B1 3/2003 Puetz et al.
6,539,147 B1 3/2003 Mahony
6,539,160 B2 3/2003 Battey et al.
6,542,688 B1 4/2003 Battey et al.
6,554,485 B1 4/2003 Beatty et al.
6,556,763 B1 4/2003 Puetz et al.
6,571,047 B1 5/2003 Yarkosky et al.
6,577,595 B1 6/2003 Counterman
6,584,267 B1 6/2003 Caveney et al.
6,591,051 B2 7/2003 Solheid et al.
6,597,670 B1 7/2003 Tweedy et al.
6,614,978 B1 9/2003 Caveney
6,614,980 B1 9/2003 Mahony
6,621,975 B2 9/2003 Laporte et al.
6,623,170 B2 9/2003 Petrillo
6,625,375 B1 9/2003 Mahony
6,631,237 B2 10/2003 Knudsen et al.
6,633,717 B1 10/2003 Knight et al.
6,654,536 B2 11/2003 Battey et al.
6,661,961 B1 12/2003 Allen et al.
6,668,127 B1 12/2003 Mahony
6,678,457 B2 1/2004 Kim et al.
6,711,339 B2 3/2004 Puetz et al.
6,755,574 B2 6/2004 Fujiwara et al.
6,760,530 B1 7/2004 Mandry
6,760,531 B1 7/2004 Solheid et al.
6,768,860 B2 7/2004 Liberty
6,778,752 B2 8/2004 Laporte et al.
6,788,786 B1 9/2004 Kessler et al.
6,792,190 B2 9/2004 Xin et al.
6,792,191 B1 9/2004 Clapp et al.
6,796,437 B2 9/2004 Krampotich et al.
6,815,612 B2 11/2004 Bloodworth et al.
6,845,207 B2 1/2005 Schray
6,848,836 B2 2/2005 Ueda et al.
6,850,685 B2 2/2005 Tinucci et al.
6,853,795 B2 2/2005 Dagley et al.
6,870,734 B2 3/2005 Mertesdorf et al.
6,901,200 B2 5/2005 Schray
6,909,833 B2 6/2005 Henschel et al.
6,920,274 B2 7/2005 Rapp et al.

(56) References Cited

U.S. PATENT DOCUMENTS

| | | | |
|---|---|---|---|
| 6,925,241 | B2 | 8/2005 | Bohle et al. |
| 6,950,593 | B2 | 9/2005 | Hodge et al. |
| 6,968,111 | B2 | 11/2005 | Trebesch et al. |
| 6,980,725 | B1 | 12/2005 | Swieconek |
| 6,983,095 | B2 | 1/2006 | Reagan et al. |
| 7,029,322 | B2 | 4/2006 | Ernst et al. |
| 7,086,539 | B2 | 8/2006 | Knudsen et al. |
| 7,088,899 | B2 | 8/2006 | Reagan et al. |
| 7,103,255 | B2 | 9/2006 | Reagan et al. |
| 7,120,347 | B2 | 10/2006 | Blackwell, Jr. et al. |
| 7,139,461 | B2 | 11/2006 | Puetz et al. |
| 7,142,764 | B2 | 11/2006 | Allen et al. |
| 7,146,089 | B2 | 12/2006 | Reagan et al. |
| 7,149,398 | B2 | 12/2006 | Solheid et al. |
| 7,171,102 | B2 | 1/2007 | Reagan et al. |
| 7,200,317 | B2 | 4/2007 | Reagan et al. |
| 7,218,827 | B2 | 5/2007 | Vongseng et al. |
| 7,228,036 | B2 | 6/2007 | Elkins, II et al. |
| 7,239,789 | B2 | 7/2007 | Grubish et al. |
| 7,277,620 | B2 | 10/2007 | Vongseng et al. |
| 7,333,707 | B2 | 2/2008 | Puetz et al. |
| 7,340,146 | B2 | 3/2008 | Lampert et al. |
| 7,369,741 | B2 | 5/2008 | Reagan et al. |
| 7,407,330 | B2 | 8/2008 | Smith et al. |
| 7,457,503 | B2 | 11/2008 | Solheid et al. |
| 7,471,869 | B2 | 12/2008 | Reagan et al. |
| 7,623,749 | B2 | 11/2009 | Reagan et al. |
| 7,646,958 | B1 | 1/2010 | Reagan et al. |
| 7,826,706 | B2 | 11/2010 | Vongseng et al. |
| 2002/0034290 | A1 | 3/2002 | Pershan |
| 2002/0118943 | A1 | 8/2002 | Aolheid et al. |
| 2002/0150372 | A1 | 10/2002 | Schray |
| 2002/0176681 | A1 | 11/2002 | Puetz et al. |
| 2002/0181893 | A1 | 12/2002 | White et al. |
| 2003/0002812 | A1 | 1/2003 | Lampert |
| 2003/0095772 | A1 | 5/2003 | Solheid et al. |
| 2003/0113086 | A1 | 6/2003 | Jun et al. |
| 2003/0165315 | A1 | 9/2003 | Trebesch et al. |
| 2003/0174996 | A1 | 9/2003 | Henschel et al. |
| 2003/0185535 | A1 | 10/2003 | Tinucci et al. |
| 2003/0207601 | A1 | 11/2003 | Adachi |
| 2004/0001686 | A1* | 1/2004 | Smith et al. ..... 385/135 |
| 2004/0037533 | A1 | 2/2004 | Knudsen |
| 2004/0074852 | A1 | 4/2004 | Knudsen et al. |
| 2004/0126069 | A1 | 7/2004 | Jong et al. |
| 2004/0165852 | A1 | 8/2004 | Erwin et al. |
| 2004/0228598 | A1 | 11/2004 | Allen et al. |
| 2004/0264873 | A1 | 12/2004 | Smith et al. |
| 2005/0002633 | A1 | 1/2005 | Solheid et al. |
| 2005/0129379 | A1 | 6/2005 | Reagan et al. |
| 2008/0008436 | A1 | 1/2008 | Reagan et al. |
| 2008/0008437 | A1 | 1/2008 | Reagan et al. |
| 2008/0019655 | A1 | 1/2008 | Vongseng et al. |
| 2008/0025684 | A1 | 1/2008 | Vongseng et al. |
| 2008/0317425 | A1 | 12/2008 | Smith et al. |
| 2009/0074372 | A1 | 3/2009 | Solheid et al. |
| 2009/0087157 | A1 | 4/2009 | Smith et al. |
| 2009/0190896 | A1 | 7/2009 | Smith et al. |
| 2009/0196565 | A1 | 8/2009 | Vongseng et al. |
| 2009/0285540 | A1 | 11/2009 | Reagan et al. |
| 2009/0290843 | A1 | 11/2009 | Reagan et al. |
| 2009/0297111 | A1 | 12/2009 | Reagan et al. |
| 2010/0124392 | A1 | 5/2010 | Reagan et al. |
| 2010/0226615 | A1 | 9/2010 | Reagan et al. |
| 2011/0019965 | A1 | 1/2011 | Smith et al. |
| 2011/0019966 | A1 | 1/2011 | Reagan et al. |
| 2011/0033158 | A1 | 2/2011 | Smith et al. |
| 2011/0033164 | A1 | 2/2011 | Solheid et al. |

FOREIGN PATENT DOCUMENTS

| | | | |
|---|---|---|---|
| DE | 42 29 510 | A1 | 3/1994 |
| EP | 0 293 183 | A2 | 11/1988 |
| EP | 0 349 290 | A1 | 1/1990 |
| EP | 0 585 809 | A1 | 3/1994 |
| EP | 0 697 610 | A1 | 2/1996 |
| EP | 0 743 701 | A2 | 11/1996 |
| EP | 0 788 002 | A1 | 8/1997 |
| EP | 0 871 047 | A1 | 10/1998 |
| EP | 0 975 180 | A1 | 1/2000 |
| EP | 1 045 267 | A1 | 10/2000 |
| EP | 1160603 | | 12/2001 |
| EP | 1 316 829 | A2 | 6/2003 |
| JP | 63-229409 | | 9/1988 |
| JP | 2000-075180 | | 3/2000 |
| JP | 2001-027720 | | 1/2001 |
| JP | 1144266 | S | 6/2002 |
| JP | 3307618 | B2 | 7/2002 |
| JP | 3761762 | B2 | 3/2006 |
| WO | WO 95/20175 | | 7/1995 |
| WO | WO 98/53347 | | 11/1998 |
| WO | WO 99/27404 | | 6/1999 |
| WO | WO 00/05611 | | 2/2000 |
| WO | WO 00/07053 | | 2/2000 |
| WO | WO 00/52504 | | 9/2000 |
| WO | WO 00/75706 | A2 | 12/2000 |
| WO | WO 01/31380 | A1 | 5/2001 |
| WO | WO 01/35142 | | 5/2001 |
| WO | WO 02/21182 | A1 | 3/2002 |
| WO | WO 02/103429 | | 12/2002 |
| WO | WO 2004/032532 | | 4/2004 |

OTHER PUBLICATIONS

International Search Report and Written Opinion of the International Searching Authority for Application No. PCT/US/2004/007932, mailed Aug. 10, 2004.

European Search Report cited in Application No. 10171732.0 mailed Aug. 30, 2010.

"ADC OMX 600 Optical Distribution Frame Solution," *ADC Telecommunications, Inc.,* Publication No. 856, 8 pgs. (Feb. 2000).

"OMX™ 600 Optical Distribution Frame," *ADC Telecommunications, Inc.,* Publication No. 854, front cover, table of contents, pp. 1-13, rear cover (Apr. 2000).

21 photographs showing what AFL Telecommunications LLC purports to be the ECOE cabinet. AFL Telecommunications LLC asserts the cabinet was on sale as early as 2001.

24 photos of LambdaUnite® Blank Card; "LambdaUnite® MultiService Switch (MSS)" brochure (2003); and "Lucent's LambdaUnite® Busts Out" official release (Jan. 29, 2002) (33 pages total).

ADC Telecommunications brochure entitled "Fiber Cable Management Products, Second Edition," 144 pages, dated Oct. 1995.

ADC Telecommunications brochure entitled "FL2000 Products," 48 pages, dated Nov. 1996.

ADC Telecommunications, Inc., brochure titled *Value-Added module System,* © 2000 (29 pages).

ADC Telecommunications, Inc., brochure titled *Value-Added module System: Optical Distribution Frame* (*OMX™ 600*), © 2001 (11 pages).

ADC Telecommunications, Inc.'s 2nd Edition of Fiber Panel Products; front cover, Table of Contents, pp. 1-111, and back cover; revised Jul. 1996, Item No. 846.

ADC Telecommunications brochure entitled "Next Generation Frame (NGF) Product Family Ordering Guide," 21 pages, dated Oct. 1998.

ADC Telecommunications, Inc.'s 6th Edition of Next Generation Frame (NGF) Product Family Ordering Guide; front cover, Table of Contents, pp. 1-41, and back cover; revised Feb. 2003, Item No. 820.

ADC Telecommunications, Inc.'s Fiber Optic, Cable Assemblies and Accessories Brochure; front cover, Table of Contents, pp. 1-23, and back cover; revised Apr. 2003, Item No. 100300.

ADC Telecommunications, Inc.'s Secure Fiber Entrance Terminal (SFET) Brochure; front cover, pp. 2-7, and back cover; revised May 1998, Item No. 1005.

ADC Telecommunications, Inc.'s Outside Plant, Fiber Cross-Connect Solutions Products Brochure; front cover, Table of Contents, pp. 1-48, and back cover.; revised Jun. 2002, Item No. 1047.

(56) References Cited

OTHER PUBLICATIONS

AMP Inc. catalog entitled "Fiber Optic Products," front and back covers and p. 59, (4 pgs.) (© 1991).
Assembly reference drawings having drawing No. 1067101, dated Aug. 17, 1999 (8 pages).
AT&T Network Systems catalog entitled "Fiber Optic Products Innovation for wide ranging applications," front and back covers and pp. 6-1 through 6-16 (18 pages total) (© 1995).
ATI Optique Catalog, ATI Optique Division of TI electronique, Version 2.6, released Mar. 27, 2002 (50 pages).
Brochure from Amphenol Corp. entitled "Amphenol® 954 Series one piece SC Connector," 2 pgs. (1990).
Connectorized splitter drawings having drawing No. 1067961, dated Aug. 18, 1999 (2 pages).
*Couplers: Couplers WDMS Packaging,* Alcoa Fujikura Ltd., Telecommunications Division, © 2000 (5 pages) showing AFL splitters.
Fiber distribution drawings having drawing No. 1069967, dated Aug. 17, 1999 (2 pages).
FONS Corporation's MDC Series Rack or Wall Mount Enclosures product sheet, 3 pages, (2002).
FONS Corporation's Modular Distribution Cabinets Rack Mount Enclosures, Model MDC-7, product sheet, 2 pages (2005).
FONS Corporation's Technical Drawing No. 11669, Rev. D, of Distribution Cabinet Assembly MFDC-7, 1 page (technical drawing depicting the device shown in above listed product sheet).
Hasegawa et al., *100GHz-48CH Athermal AWG with a Novel Temperature Insensitive Principle,* National Fiber Optics Engineers Conference, 2003 Technical Proceedings, pp. 801-808.
HRS catalog entitled "Optical Fibre Connectors," front and back covers and pp. 16, 17 and 49 (5 pages) (Mar. 1991).
Installation drawings having drawing No. 1069965, dated Aug. 14, 1999 (3 pages).
Iwano, S. et al., "MU-type Optical Fiber Connector System," *NTT Review,* vol. 9, No. 2, pp. 63-71 (Mar. 1997).
Nexans, Cross-Connect Cabinet III: Plastic Watertight Cabinet for FTTH Applications, dated 2002 (2 pages).
Nexans, Cross-Connect Cabinet V: Metallic Watertight Cabinet for FTTH Applications, dated 2002 (2 pages).
NTT Int'l Fiber Termination Module (FTM) & Premises Optical Distribution Cabinets (PODC) product brochure, 3 pages, undated.
Optical fiber coupler review, Technical Report 2001, showing Sumitomo Osaka Cement Co. Ltd's Optical Coupler (pp. 41-42).
Sugita, E. et al., "SC-Type Single-Mode Optical Fiber Connectors," *Journal of Lightwave Technology,* vol. 7, No. 11, pp. 1689-1696 (Nov. 1989).
Tachikura et al., "Newly Developed Optical Fiber Distribution System and Cable Management in Central Office," *International Wire & Cable Symposium, Proceedings of the 50th IWCS,* pp. 98-105.
European Search Report cited in Application No. 10181672.6 mailed Feb. 22, 2011.
European Search Report cited in Application No. 10181680.9 mailed Feb. 22, 2011.
Exhibit A, Drawings showing an ADC fiber storage trough concept including presentation entitled "Fujitsu Fiber Management Project Fiber Trough Concept", 11 pages (Jun. 2002).
Exhibit B, Drawings showing another ADC fiber storage trough concept including presentation entitled "Fujitsu Fiber Management Project Fiber Trough Concept" by Kathy Barnes (7 pages), photos of trough disclosed in presentation by Kathy Barnes installed in a rack (3 pages) and presentation entitled "Fujitsu Fiber Management Project Fiber Trough Concept" by Dan Mertesdorf (9 pages), 19 total pages (Apr. 2002).
Exhibit C, "Retainer Staright [sic] Removable SC," which shows a latch design, 2 pages (Jan. 17, 2006).
Complaint relating to Civil Action No. 08-CV-5222-RMK-JJK, filed Sep. 19, 2008 (8 pages).
First Amended Complaint relating to *ADC Telecommunications, Inc.* v. *Tyco Electronics Corp.,* Civil Action No. 08-CV-05222, filed Dec. 8, 2008.
Answer, Affirmative Defenses, and Counter Claims to the First Amended Complaint relating to *ADC Telecommunications, Inc.* v. *Tyco Electronics Corp.,* Civil Action No. 08-CV-05222, filed Mar. 13, 2009.
ADC's Reply to Counterclaims and Counterclaims relating to *ADC Telecommunications, Inc.* v. *Tyco Electronics Corp.,* Civil Action No. 08-CV-05222, filed Apr. 2, 2009.
Stipulated Dismissal of all Claims and Counterclaims relating to *ADC Telecommunications, Inc.* v. *Tyco Electronics Corp.,* Civil Action No. 08-CV-05222, filed Oct. 30, 2009.
*Supplemental prior art statement* submitted by AFL Telecommunications LLC in Civil Action No. 08-CV-02234-DWF-JSM on May 19, 2009 (155 pages).
Response to prior art statement submitted by ADC Telecommunications, Inc. in Civil Action No. 08-CV-02234-DWF-JSM on Aug. 18, 2009 (131 pages).
*Second supplemental prior art statement* filed Nov. 10, 2009 by AFL Telecommunications LLC in Civil Action No. 08-CV-02234-DWF-JSM, which was filed Jun. 13, 2008.
Hecht, J., "Connectors," *Understanding Fiber Optics,* Chapter 13, Third Edition, pp. 251-265 (Copyright 1999).

* cited by examiner

OPTICAL FIBER INTERCONNECT CABINETS, TERMINATION MODULES AND FIBER CONNECTIVITY MANAGEMENT FOR THE SAME

Matter enclosed in heavy brackets [ ] appears in the original patent but forms no part of this reissue specification; matter printed in italics indicates the additions made by reissue.

RELATED APPLICATIONS

The present application claims priority to and is a continuation of U.S. patent application Ser. No. 10/799,328, filed Mar. 12, 2004, now U.S. Pat. No. 7,142,764 which claims priority from U.S. Provisional Application No. 60/456,323, filed Mar. 20, 2003, the disclosures of which are hereby incorporated herein in their entirety by reference.

BACKGROUND OF THE INVENTION

The present invention relates to optical fiber management and, more particularly, to systems for connecting optical fibers.

When providing services using an optical fiber network, it is generally necessary to add and drop subscribers over time. As a result, a variety of methods are provided for interconnecting subscriber locations with a central office connecting facility operated by an optical network provider. To improve the utilization of communication circuits within such a central office facility, interconnection cabinets, such as a centralized splitter cabinet (CSC) and/or centralized splitter cross-connect (CSX), may be provided as part of the outside plant (OSP) infrastructure of the optical fiber network. Doing so may allow some of the burden of establishing and changing connections on the network to be shifted away from the central office and facilitate incremental growth of an installed network as new subscribers are added.

A centralized splitter cabinet (CSC) is typically a passive optical enclosure that provides random termination of optical splitters suitable for use in OSP environment. A CSC may be pedestal or pole mounted in the field. A CSC may provide a flexibility point for termination of distribution cable as well as enclosing a splitter array. This flexibility in interconnections of the downstream fiber network may facilitate optimization of the use of electronic equipment in the central office by, for example, avoiding the need to dedicate circuits in the central office to each subscriber location when many such locations may not be active.

A field service technician may be sent to the CSC to modify the selection of a subscriber location coupled through a splitter to a particular fiber from the central office by connecting and disconnecting various cables found in the CSC. For example, it is known to provide connectorized pigtail cables associated with each subscriber location serviced by a CSC in the CSC. A technician can then select the cable for a designated subscriber location, for example, based on a label attached to the pigtail, and insert the selected cable in a connection point of a splitter.

Some currently available splitter interconnect cabinets utilize industry standard connectorized bulkhead modules to house splitters. These designs generally do not permit access to the rear of the connector without breaking a warranty seal and are designed for the central office environment. The seal may be critical for the manufacturer to ensure that no damage to the splitter occurs post-manufacturing (in the field). This requirement may be in direct opposition to the cleaning requirement, for which access to the front and back of a connection point may be desired.

SUMMARY OF THE INVENTION

Embodiments of the present invention provide interconnect cabinets for optical fibers that include an enclosure and a splitter and termination panel mounted in the enclosure. The splitter has a plurality of optical fiber connectorized pigtails extending therefrom. Each of the connectorized pigtails is associated with an optical fiber feeder cable to be coupled to a central office. The termination panel has a plurality of optical fiber connection members, ones of which are associated with respective subscriber locations. The connectorized pigtails have a cable length sufficient to allow connection to the plurality of connection members.

In further embodiments of the present invention, the splitter further includes at least one input optical fiber and the splitter is configured to splice the at least one input optical fiber to the plurality of connectorized pigtails. An optical fiber cable from the central office may be coupled to the at least one input optical fiber and optical fiber cables from the subscriber locations may be coupled to the plurality of connection members. The splitter may be an optical fiber splitter tray and the enclosure may be configured to receive a plurality of optical fiber splitter trays and/or a plurality of termination panels. The plurality of connectorized pigtails may have substantially the same length. The enclosure may be a double-walled housing configured to provide passive cooling.

In other embodiments of the present invention, the termination panel is pivotally mounted in the enclosure to allow access to a front and a back side of the connection members from a front side of the enclosure. The termination panel may be a front panel of a termination module and the termination module may further include a splice chamber configured to mount a plurality of splice modules adjacent a back side of the termination panel. The splice chamber may be pivotally mounted in the enclosure to provide access to the splice chamber from the front side of the enclosure. The termination module may be removably mounted in the enclosure to allow removal of the termination module through the front side of the enclosure. The termination panel and the splice chamber may be pivotally mounted in the enclosure for independent pivotal movement.

In further embodiments of the present invention, the termination module further includes a movable cable securing member configured to receive and secure an optical fiber cable, the cable securing member having a first position aligned with a closed position of the splice chamber and a second position aligned with an open position of the splice chamber. The cable securing member may include an attachment member configured to receive and retain a strength member of the optical fiber cable. The cable securing member may be detachable from the termination module to allow movement between the first position and the second position.

In other embodiments of the present invention, the cable securing member is pivotally attached to the termination module to allow movement between the first position and the second position. The cable securing member may pivot about a neutral axis having an arc length for a cable secured therein that is substantially the same in the first and the second positions to limit loads on the cable secured therein during movement of the cable securing member between the first and second positions.

In further embodiments of the present invention, the cabinet further includes a spooling system mounted in the enclosure and configured to receive and store excess cable length of the plurality of connectorized pigtails. The spooling system may include a plurality of spools displaced from each other in the enclosure by a distance corresponding to a distance between a first and last row of connection members on the termination panel. A distance between a first and a last of the spools may be about half the distance between first and last rows of connection members on the termination panel. The spooling system may also include an initial loop spool configured to receive all the connectorized pigtails and provide the connectorized pigtails a common entry point to the spooling system. The spools may be half-moon spools.

In other embodiments of the present invention, optical fiber termination modules include a mounting member adapted to be mounted to an interconnect cabinet for optical fibers. A bulkhead termination panel is pivotally mounted to the mounting member to allow access to a back side of the termination panel covered by the mounting member. A plurality of optical fiber connection members are mounted in the termination panel. The connection members may include a front socket configured to receive a mating optical fiber plug connector and a back socket configured to receive a mating optical fiber plug connector to provide an optical coupling between the mating optical fiber plug connectors received therein.

In further embodiments of the present invention, the termination module includes a splice chamber mounted to the mounting member proximate the back side of the termination panel. The splice chamber is configured to receive at least one splice module. The splice chamber may be pivotally mounted to the mounting member for pivotal movement separately from the termination panel. A front side of the splice chamber may face the termination panel and the at least one splice module may be received on an opposite, back side of the splice chamber. The splice module may be accessible in an open position of the splice chamber. The splice module may be a splice tray.

In other embodiments of the present invention, the termination module includes the splice module(s) and a plurality of connectorized pigtails extending from the splice module(s) to the connector members on a back side of the termination panel. The splice chamber may also include an optical fiber slack receiving region positioned between the splice module (s) and the termination panel. A mounting means may be provided for removably mounting the termination module in an optical fiber interconnect cabinet.

In yet other embodiments of the present invention, configuring an interconnect cabinet for optical fibers for outside plant management of subscriber optical fiber connectivity includes providing a termination panel in the cabinet having a plurality of optical fiber connection points and a splitter in the cabinet having a plurality of optical fiber connectorized pigtails extending therefrom, the connectorized pigtails have a cable length sufficient to allow connection to the plurality of connection points. The connectorized pigtails are optically spliced to an optical fiber feeder cable coupled to a central office. The plurality of optical fiber connection points are optically spliced to respective subscriber locations.

In further embodiments of the present invention, ones of the connectorized pigtails are selectively coupled to ones of the connection points to provide service to designated ones of the subscriber locations. One of the connectorized pigtails may be selectively decoupled from one of the connection points to terminate service for a designated one of the subscriber locations. The cabinet may further include a plurality of fiber management spools and the connectorized pigtails may be routed around selected ones of the fiber management spools based on a location of a connection point to which they are to be coupled. The pigtails may be optically spliced to an optical fiber feeder cable coupled to a central office in a splice closure outside of the interconnect cabinet.

In other embodiments of the present invention, interconnect cabinets for optical fibers include an enclosure and a termination panel mounted in the enclosure and having a plurality of optical fiber connection members, ones of which are associated with respective subscriber locations or are associated with an optical fiber feeder cable to be coupled to a central office. One or more jumper cables are provided for cross-connecting ones of the connection members. A spooling system mounted in the enclosure is configured to receive and store excess cable length of the jumper cable(s). The jumper cable(s) have a cable length sufficient to allow cross-connecting of the plurality of connection members. The spooling system may include a plurality of spools displaced from each other in the enclosure by a distance corresponding to a distance between a first and last row of connection members on the termination panel. The spooling system may further include a mid-point spool.

BRIEF DESCRIPTION OF THE DRAWINGS

FIG. 7b is a front perspective view of the termination module of FIG. 7a;

DETAILED DESCRIPTION

Figure 1:
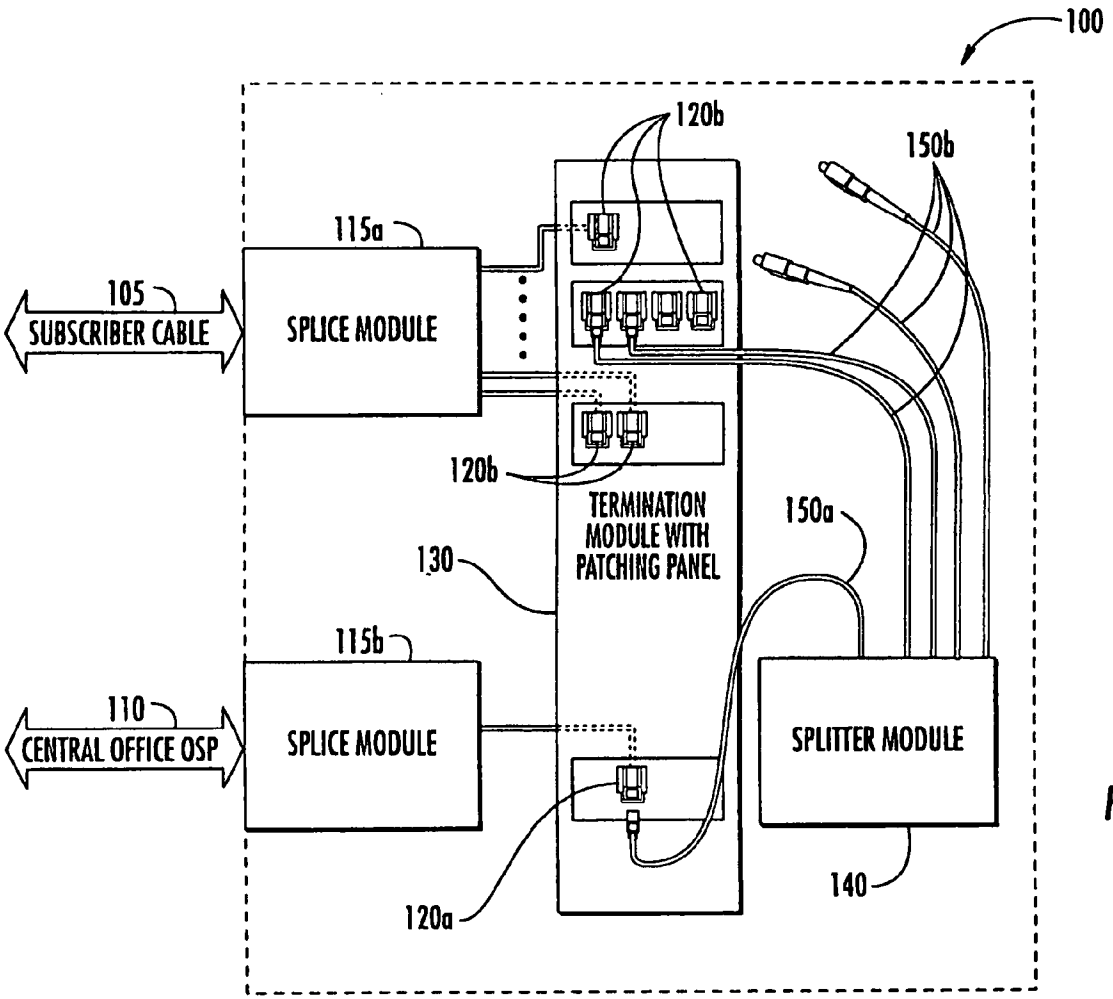
FIG. 1 is a schematic diagram illustrating an interconnect cabinet for optical fibers according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

Some embodiments of the present invention utilize a multi-layer, fold down tray approach to support various functions, such as slack storage, pigtail to outside plant (OSP) cable splicing and angle down front patching. A termination module according to such embodiments may be designed in a modular fashion so that it can be used separately in a small pedestal or ganged together with other termination modules in a pad (i.e. ground) or pole mounted cabinet. The termination modules may also be pre-terminated to subscriber location optical fibers before mounting in an interconnect cabinet. The termination modules in some embodiments may also be removed from the cabinet and carried to a remote location, such as a splice truck, to facilitate initial installation.

The termination modules in some embodiments include splice trays therein that may be oriented such that they can be worked on remotely or in the cabinet when a repair situation arises. In some embodiments, the entire patching field pivots downward and/or sideways, allowing access to both sides of the connector for cleaning while potentially reducing or avoiding the normal disruption of disconnecting existing subscribers to gain access. Cleaning both sides of an optical connector may be beneficial, particularly when using connectors in the OSP. A detachable cable security member is incorporated into some embodiments of the termination module of the present invention, which may allow fixation of the cable as well as the central strength member in both an open and closed position of the termination module without placing undue strain on the cable from a change in orientation of the termination module during installation or the like.

The cable security member of some embodiments of the present invention need only be separated from the termination module during closing (when the termination panel is moved from an open to a closed position). The relative position of the cable security member to the splice trays may remain substantially unchanged during the closing (or opening).

A splitter module array (one or more splitters) can be built up incrementally in a cabinet by adding one pre-connectorized splitter module at a time in some embodiments of the present invention. The splitter module may, for example, be splitter/splice trays coupled to a hanger bracket for purposes of mounting. However, alternative embodiments may use a splitter box that is loaded into a rack or some other bracket. Labels on the forward facing edge of the splitter module may be included to indicate subscribers allocated to that splitter. Labels on the front of the splitter module could also be included to indicate test data and/or relevant manufacturing information.

In some embodiments of the present invention, random over-length storage of connectorized pigtails exiting the splitters may incorporate the use of half-moon spools, which may provide bend control as well as incremental slack compensation. The spools may be, for example, evenly spaced such that each spool is allocated to specific fields of the patch panel, which may simplify tracing of pigtails.

In various embodiments of the present invention, only front access may be needed to work on cabinet. General fiber management and organization may be a problem with existing cabinet designs. Some embodiments of the present invention may overcome these shortcomings by regrouping the various functions (splicing, patching, splitting) in a way that may be counter-intuitive to standard practices. This regrouping of functions may significantly increase productivity, craft friendliness and/or maintainability of fiber management in interconnect cabinets according to some embodiments of the present invention.

For some embodiments of the present invention, as will be described further herein with reference to the figures, shifting the bulkhead connection point from the splitter to a patch panel may permit access to both sides of the connection point for cleaning. Also, for some embodiments of the present invention, a reduced number of loose/unterminated pigtails may need to be managed during routine maintenance and reconfiguration. Various embodiments of the present invention may provide for 216 or more pigtails hanging in bunches and that number may be incrementally reduced as subscribers are added to the network. Some embodiments of the present invention may reduce this congestion to a maximum of 15 fibers for 1×16 splitters or 31 for 1×32 splitters. This smaller number may be reduced as subscribers are added until none are left and a new splitter is added. The unused pigtails may be stored on the side of the cabinet segregated from the active fibers. The patch panel design may allow subscribers to be identified quickly as contrasted with other known approaches that require the craft to fumble through bundles of pigtails in search of one specific customer that has subscribed to the network and needs connecting.

Embodiments of the present invention will now be described with reference to the various embodiments illustrated in FIGS. 1-11. FIG. 1 is a schematic diagram illustrating an interconnect cabinet 100 for optical fibers according to some embodiments of the present invention. As shown in FIG. 1, the interconnect cabinet 100 is used for connecting subscriber cable(s) 105 with the central office outside plant (OSP) cable(s) 110 so as to manage connectivity of subscriber locations to the central office. The interconnect cabinet 100 includes splice modules 115a, 115b, a termination module 130 having a front face that provides a patch panel, a splitter module 140 and connectorized pigtails 150a, 150b.

As will be understood by those of skill in the art, the splice modules 115a, 115b may be used to connect optical fibers from the cables 105, 110 to a backside of the optical fiber connection points (members) 120a, 120b. While two splice modules 115a, 115b are illustrated in FIG. 1, more splice modules may be used depending upon the number of fibers to be routed through the interconnection cabinet 100. Furthermore, although a separate splice module 115b is shown for use with the central office cable 110, in various embodiments of the present invention, a common splice module may be used for both the cable fibers of the subscriber 105 and the central office 110. Although splice modules for making such interconnections provide benefits in routing and control of radius of curvature and the like of optical fibers, it will understood that the present invention, in some embodiments, encompasses other methods of interconnect between the subscriber and central office cables 105, 110 and the fiber connection points 120a and 120b.

As shown in FIG. 1, the splitter module 140 has a connectorized pigtail 150a extending to a fiber connection point 120b to optically couple to a fiber from the central office. The fiber from the central office is connected by the splitter module 140 to the plurality of connectorized pigtails 150b. Thus, each of the connectorized pigtails 150b are associated with an optical fiber feeder cable 110 coupled to a central office, typically through an individual fiber. The splitter module 140 may be a 4 to 1, 16 to 1, 32 to 1 or the like splitter module based on the desired number of subscribers to be carried and supported by a single fiber feed to the central office.

As illustrated in the embodiments of FIG. 1, ones of the fibers from the subscriber cable 105 associated with different subscriber locations are each coupled to respective ones of the fiber connection points 120b in the patch panel front face of the termination module 130. The connectorized pigtails 150b have a cable length sufficient to allow connection of each of the pigtails 150b to the plurality of connection points 120b. As a result, service to an individual subscriber location may be readily provided or ended by coupling or decoupling one of the connectorized pigtails 150b from the one of the fiber connection points 120b associated with that subscriber. Therefore, providing a readily determined location on the front patch panel of the termination module 130 associated with each specific subscriber may simplify the task of making a connection for a field technician who might otherwise have difficulty locating a pigtail 150b associated with a specific subscriber.

For the embodiments illustrated in FIG. 1, the fiber feed to the central office from the central office cable(s) 110, like the fiber feed of the subscriber cable(s) 105, is coupled through a splice module 115b to an interconnection point 120b on the patch panel front face of the termination module 130. While shown as a separate connection points 120a, 120b in FIG. 1, it will understood that any of the connection points 120b could likewise be used to provide an interconnection to the central office cable(s) 110. It will be further understood that, in some embodiments of the present invention, the input optical fiber to the splitter module 140 is spliced to a fiber in the central office cable(s) 110 directly without use of the termination module 130 and the connectorized pigtail 150a. For example, the input optical fiber to the splitter module 140 could be coupled to a fiber from the central office cable(s) in the splice module 115b.

Figure 2:
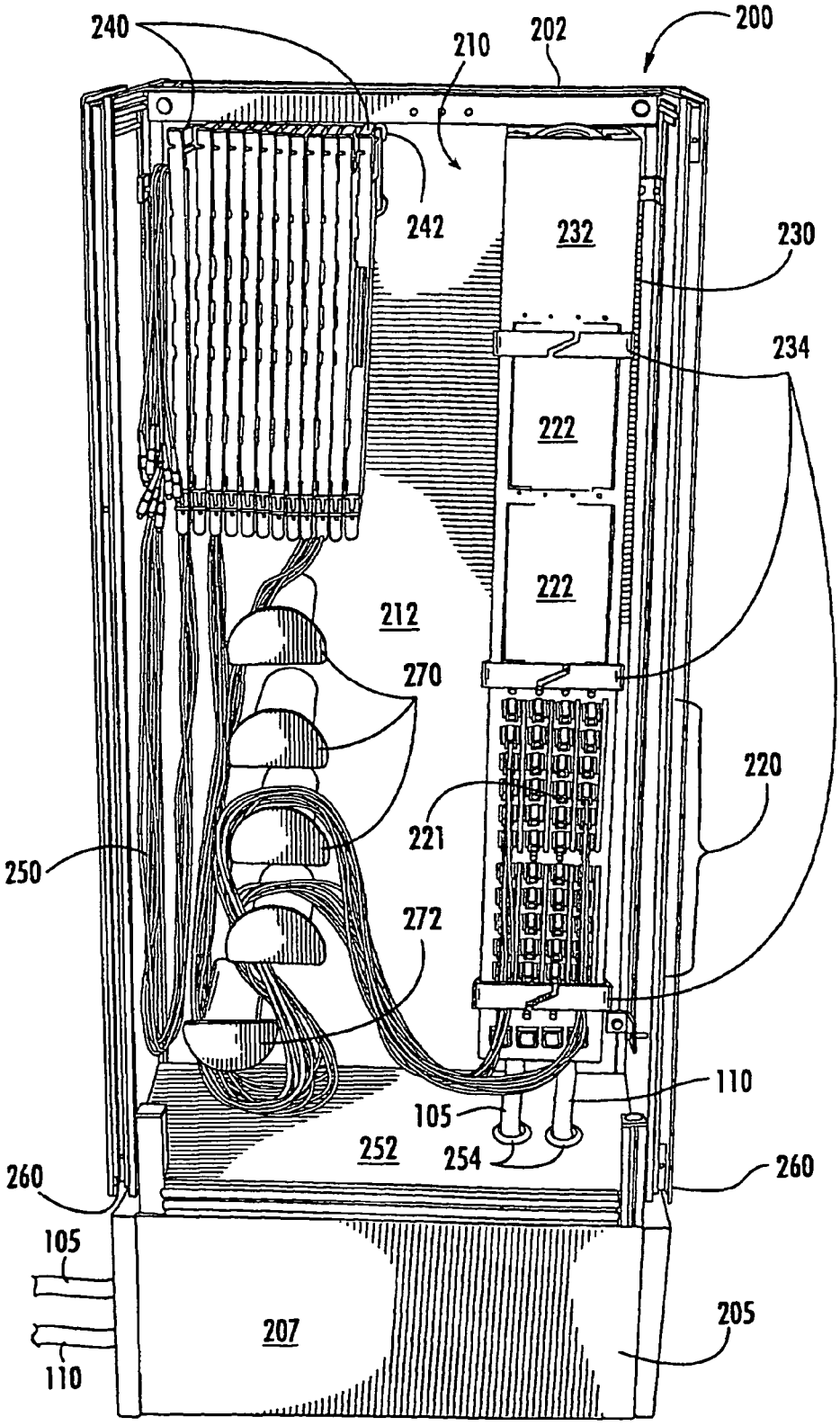
FIG. 2 is a front perspective view of an interconnect cabinet for optical fibers according to some embodiments of the present invention.

The present invention will now be further described with reference to the embodiments of an interconnect cabinet 200 for optical fibers illustrated in FIG. 2. As shown in FIG. 2, the interconnect cabinet 200 includes an enclosure 202 having an upper chamber 210 and a lower chamber 205. The enclosure 202 may be a double-walled housing configured to provide passive cooling for the cabinet 200. The subscriber and central office cables 105, 100 are received in the lower chamber 205, which is protected by a front cover panel 207. The cables 105, 100 feed through a bottom panel 252 positioned between the upper chamber 210 and the lower chamber 205 through grommets 254. Thus, for example, in the embodiments of FIG. 2, the upper chamber 210 may be provided a cleaner or more environmentally controlled environment than the lower chamber 205. However, it will be understood that various embodiments of the present invention may provide for direct routing of the cables 105 and 110 into the upper chamber 210 of a single chamber enclosure not having a separate lower chamber.

As shown in the embodiments of FIG. 2, a termination module 230, a plurality of splitter modules 240 having connectorized pigtails 250 and a plurality of spools 270, 272 are positioned in the upper chamber 210 of the housing 202. The termination module 230 is removably mounted to a back wall 212 of the upper chamber 210. The splitter modules 240 are removably mounted to the back wall 212 by brackets 242.

The termination module 230 includes a termination patch panel 232 on its front face that includes a plurality of optical fiber connection points (members) 220. The connection members 220 include sockets 221 configured to receive the connectorized plugs of the pigtails 250. As also shown in the embodiments of FIG. 2, the termination patch panel 232 may be modified based on the number of optical fibers to be connected by adding additional rows of connection members 220 in the regions 222. Three brackets 234 are shown on the termination module 230 that may be used to rest on a table or other flat surface when the termination panel 232 is rotated open to allow access to a backside of the connection member 220.

The arrangement illustrated in FIG. 2 may allow for front panel access to the various connectivity components for arranging connections to subscriber locations. As shown in FIG. 2, front side access to the cabinet 200 is provided by opening of the rotatable door panels 260 defining the front panel of the interconnect cabinet 200. However, a single panel door, removable panel or the like could also be provided to allow front side access to the chamber 210.

The spooling system 270, 272 may be used to support routing of the pigtails 250 in a manner that may advantageously control bending of the pigtails 250 to reduce the risk of damage to the optical fiber and provide further organization to the routing of the pigtails 250, particularly where a fully loaded interconnect cabinet 200 may include a large number of such pigtails 250. The spooling system 270, 272 is mounted in the enclosure 202 and configured to receive and store excess cable length of the connectorized pigtails 250. The spools 270, in some embodiments of the present invention, are displaced from each other in the enclosure by a distance corresponding to a distance between a first and last row of the connection points 220 on the termination patch panel 232. In other words, as viewed in FIG. 2, a distance from a bottom to a top one of the spools 270 may correspond to a distance from a bottom to a top row of the interconnection members 220.

As also shown in FIG. 2, the spooling system 270, 272 may include an initial loop spool 272 configured to receive all the connectorized pigtails 250 and provide the connectorized pigtails a common entry point to the spools 270. Thus, all of the pigtails 250 may first be routed underneath the initial loop spool 272 and then over a selected one of the spools 270 based on the relative distance from the bottom panel 252 of an associated row of the connection members 220 to which the pigtail 250 is to be routed. The half-moon spools illustrated in FIG. 2 may have a radius selected to provide the desired protection against damage due to bending of fibers in the pigtails 250. The connectorized pigtails 250 in some embodiments of the present invention are provided with substantially the same length. Use of selected ones of the spools 270 in routing may provide for occupying more or less unused length of such pigtails 250 based on which connection member row the pigtail 250 is routed to on the termination panel 232.

A plurality of splitter modules 240 and a single termination module 230 are illustrated in FIG. 2. However, as seen by the space between the splitters 240 and the termination module 230, a plurality of termination modules 230 may be selectively mounted in the enclosure 202 in some embodiments of the present invention.

Figure 3:
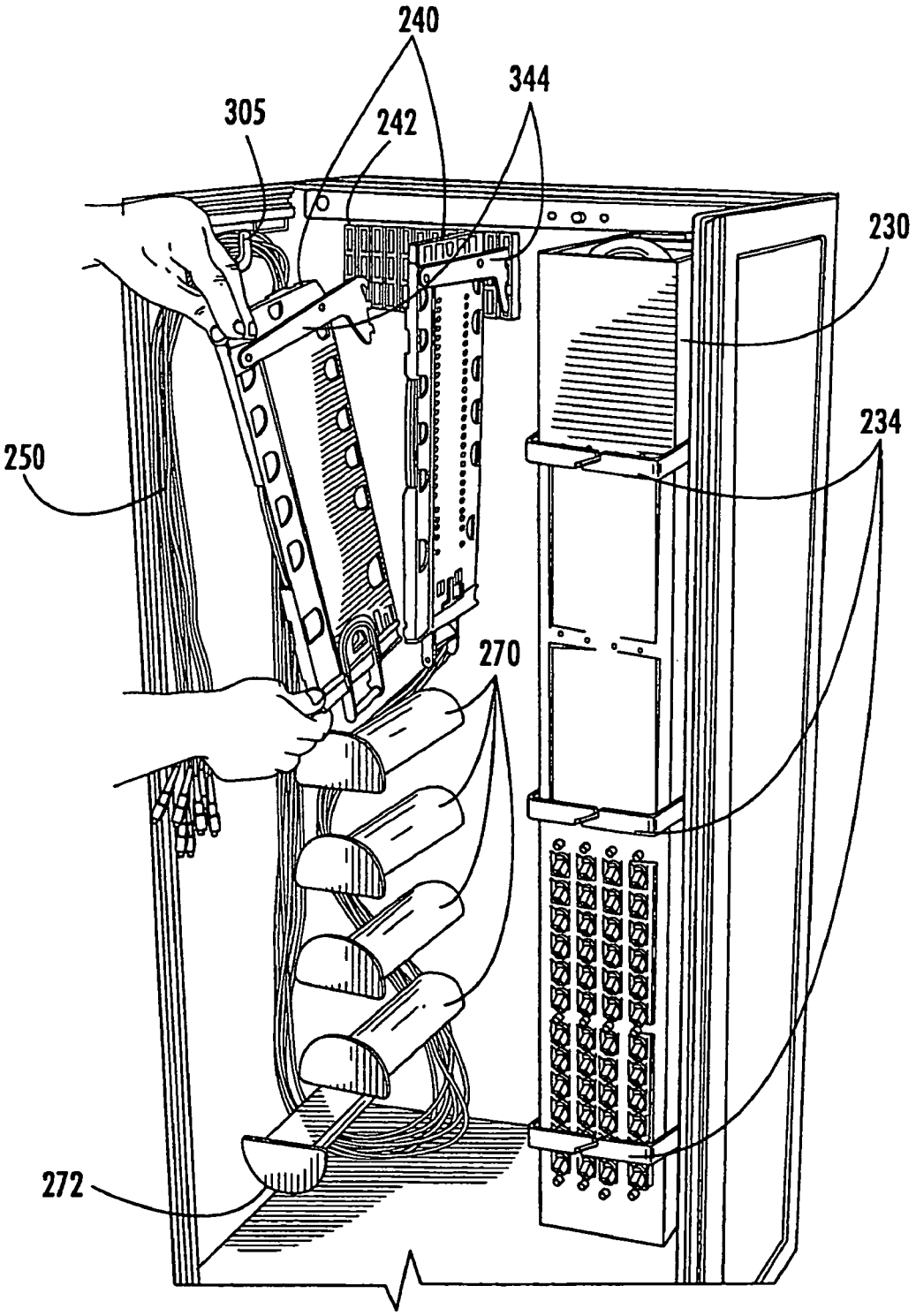
FIG. 3 is a front perspective view of an interconnect cabinet for optical fibers according to some embodiments of the present invention.

FIG. 3 is a front perspective view further illustrating some embodiments of the present invention. In particular, FIG. 3 illustrates the interconnect cabinet of FIG. 2 with only one installed splitter module 240 and a second splitter module 240 in the process of being installed. For the embodiments in FIG. 3, the splitter modules 240 are splitter trays having hanger brackets 344 attached thereto. The hanger brackets 344 engage the brackets 242 to mount the splitter trays 240 in the interconnect cabinet 200. Also illustrated in the embodiments of FIG. 3 is a hook 305 in a sidewall of the enclosure 202 that may be used to hang unused pigtails 250. The hook 305 in some embodiments of the present invention may be a spool, such as a half-moon spool.

Some embodiments of the present invention provide for routing of jumper cables to provide a cross-connect between two of the interconnection members 220, as contrasted with routing of pigtails 250 from the splitter modules 240. In such embodiments, the hook or mid-point spool 305 may be used and positioned at a location above the spools 270 to facilitate routing of the jumper cables. For example, the hook or mid-point spool 305 could be positioned to provide a turn-around point at the mid-point of the jumper cable length.

Figure 4:
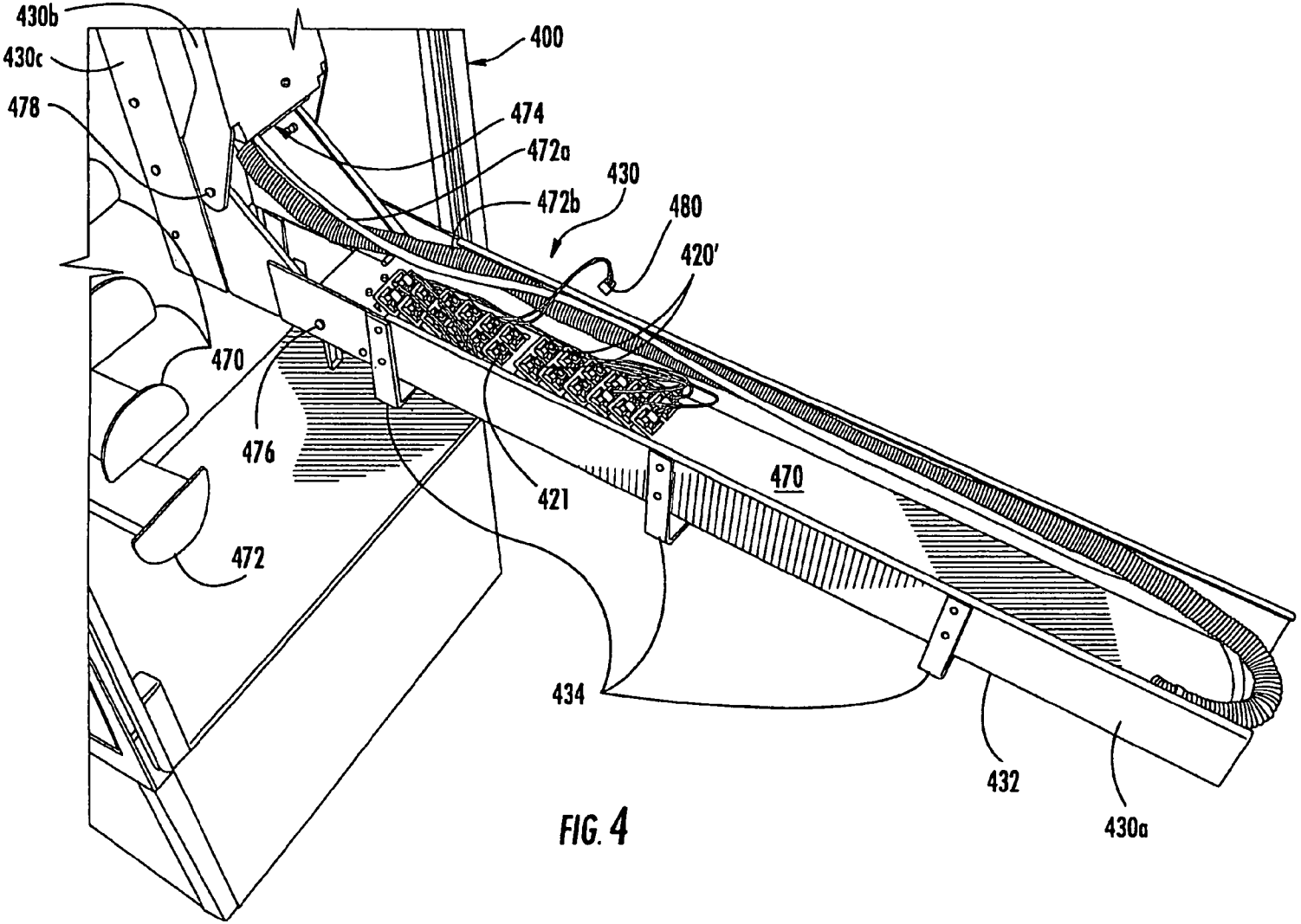
FIG. 4 is a perspective view of a termination module according to some embodiments of the present invention with the termination panel in an open position.

FIG. 4 is a perspective view of a termination module 430 according to some embodiments of the present invention with a termination panel 430a (the front face of which defines a patch panel) in an open position. The termination panel 430a may be moved to the illustrated open position by rotation about a pivot point 476 so as to allow access from the front of the interconnect cabinet 400 to a backside 420' of the interconnection members 220 mounted in the patch panel 432 of the termination panel 430a. As with the front side interconnection members 220 having sockets 221 (see FIG. 2), the backside interconnection points 420' in the embodiments of FIG. 4 include sockets 421 configured to receive connectorized pigtails 480 extending from a splice module 115a, 115b coupled to the subscriber and/or central office cables 105, 110.

The pigtail 480 may extend from a splice chamber 430b by, for example, routing through a protective conduit 472b or a hardened cable 472b. The cables 472a, 472b may extend from splice modules 115a, 115b mounted in the splice chamber 430b through an optical fiber slack receiving region 474 of the splice chamber 430b. The splice chamber 430b may also be pivotally mounted in a manner such that access to the splice region from the front side of the interconnect cabinet 400 is provided via rotation of the splice chamber 430b about a pivot point 478.

A mounting member 430c of the termination module 430b may support the pivot points 476, 478 and provide for mounting of the termination module 430 in the interconnect cabinet 400.

Also visible in FIG. 4 are the backside 470 of the patch panel 432, brackets 434 and half-moon spools 470, 472. The arrangements of the spools 470, 472 differs from that described with reference to the spools 270, 272 of FIG. 2 in that the lower initial loop spool 472 is aligned with the plurality of spools 470 rather than being offset toward the left side of the cabinet 200 as illustrated in FIG. 2.

Figure 5:
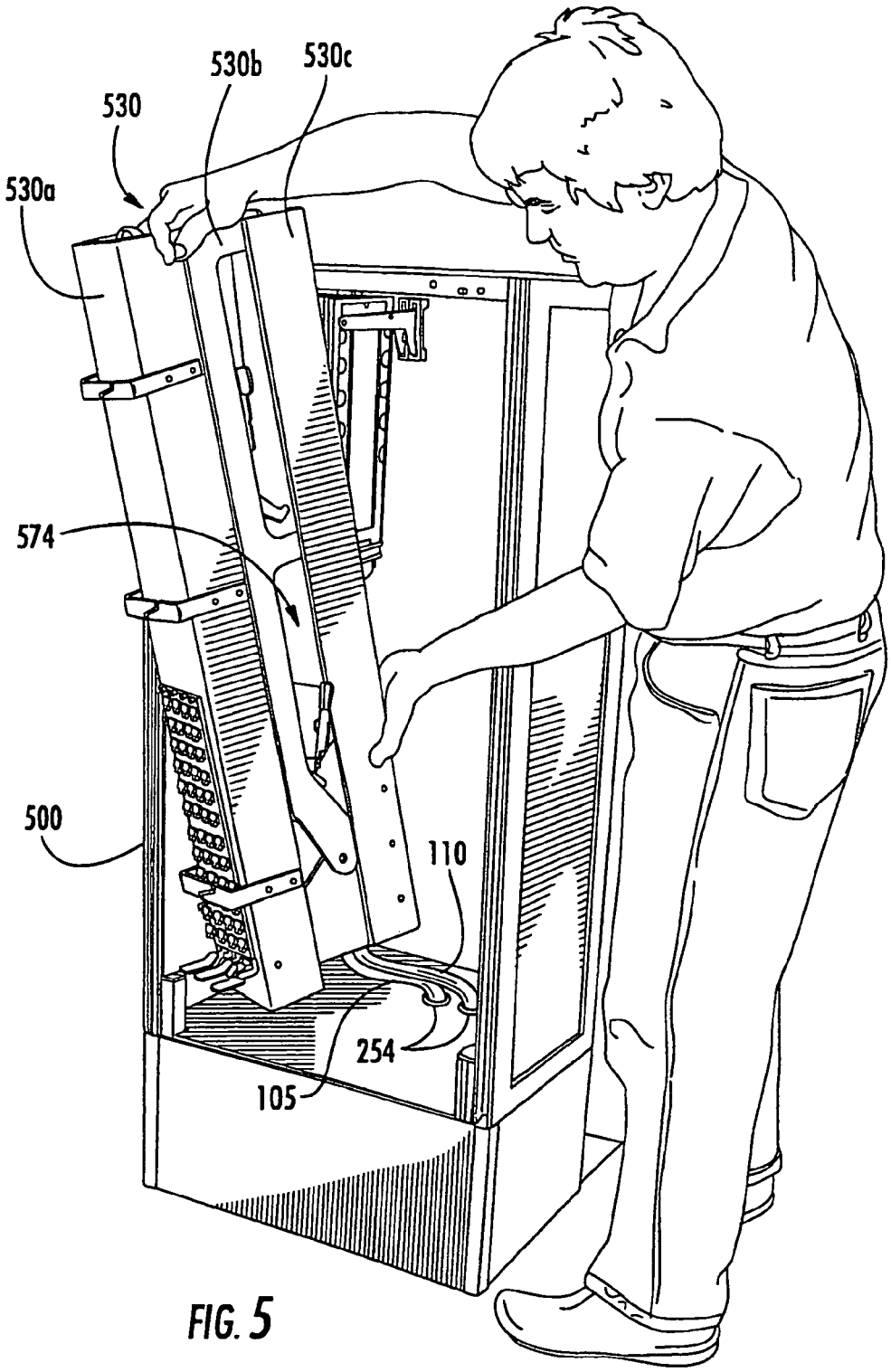
FIG. 5 is a front perspective view of an interconnect cabinet for optical fibers according to some embodiments of the present invention showing installation of a termination module in the cabinet.

FIG. 5 is a front perspective view of an interconnect cabinet 500 for optical fibers according to some embodiments of the present invention showing installation of a termination module 530 in the cabinet 500. As seen in FIG. 5, the termination module 530 may be manually removed with the cables 105, 110 connected thereto by passing excess length of the cables 105, 110 through the grommets 254. Such excess cable length may be stored in the lower chamber of the cabinet 500 or may be drawn from outside the cabinet 500 at a time when a technician removes the termination module 530 from the cabinet 500.

As seen in the embodiments of FIG. 5, the termination module 530 includes a termination panel 530a, a splice chamber 530b and a mounting member 530c. The respective elements 530a, 530b, 530c may operate substantially the same as described in FIG. 4 with reference to like numbered elements (430a, 430b, 430c).

Figure 6A:
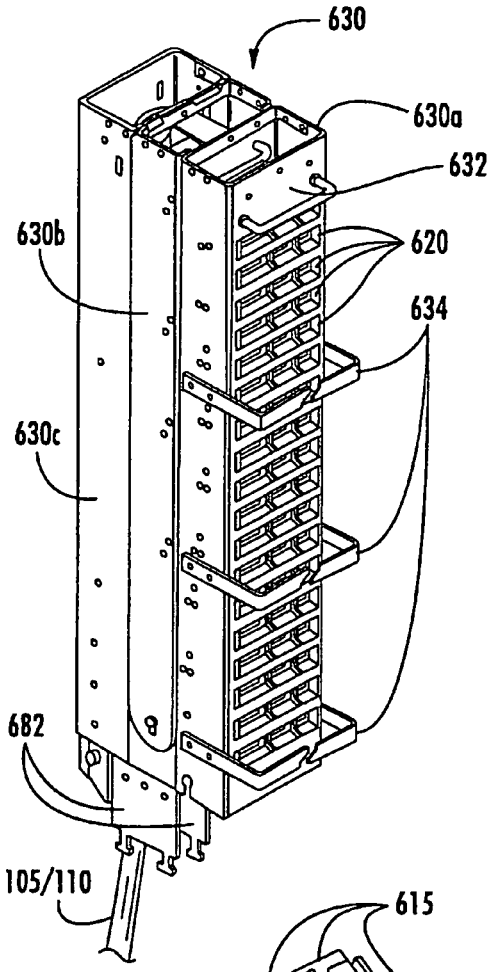
FIG. 6a is a perspective view of a termination module according to some embodiments of the present invention in a closed position.
Figure 6B:
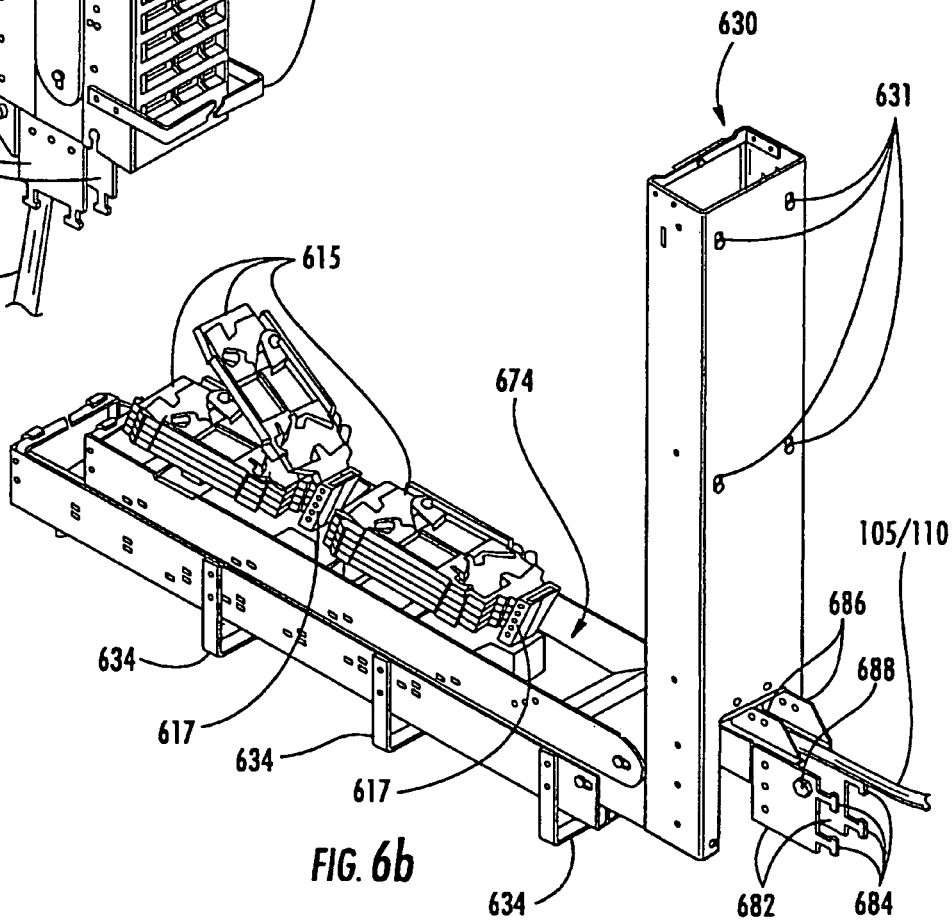
FIG. 6b is a perspective view of the termination module of FIG. 6a in an open position showing the splice chamber and trays.
Figure 6C:
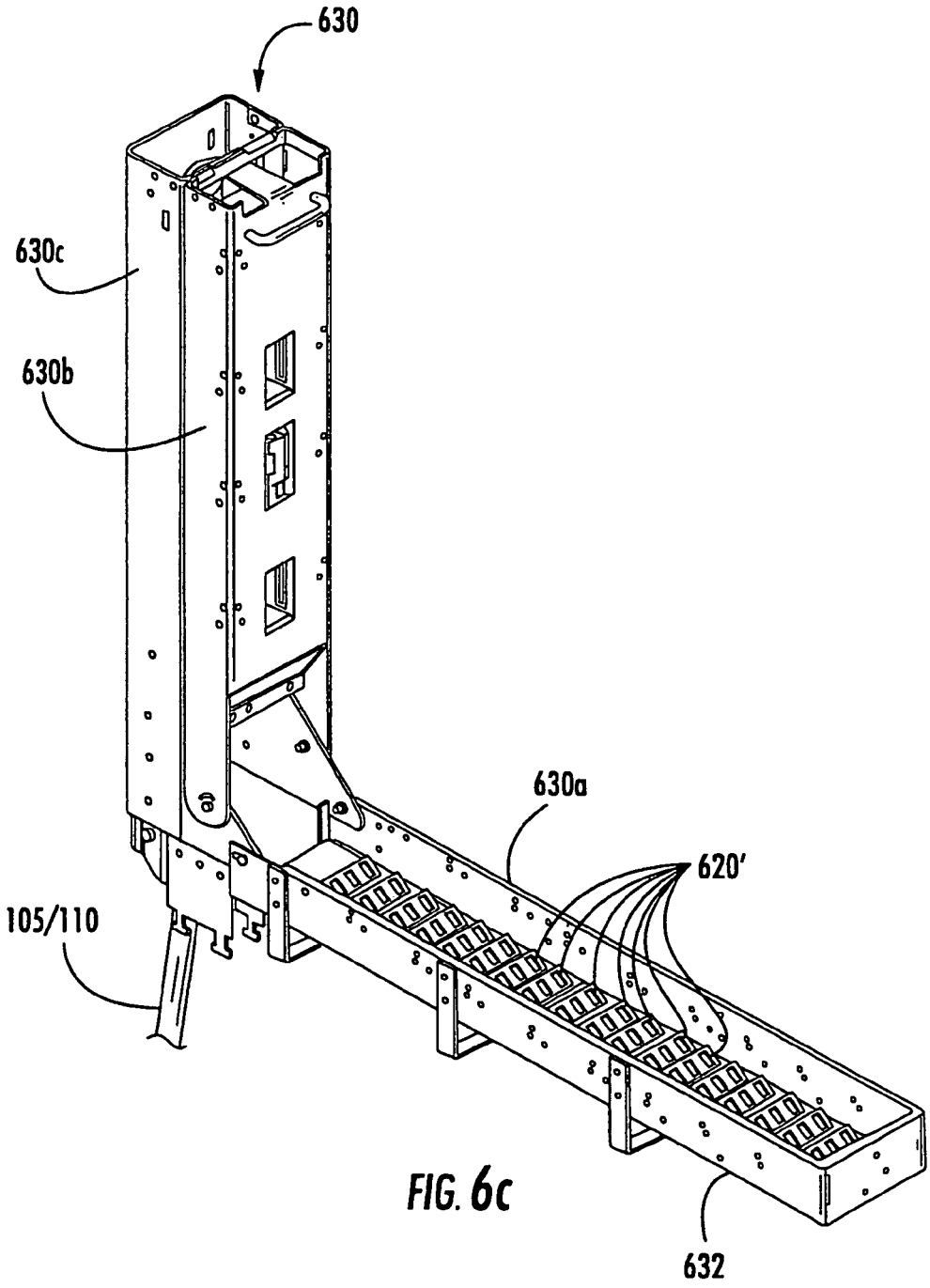
FIG. 6c is a perspective view of the termination module of FIG. 6a in another open position showing the back side of the termination panel.

Further embodiments of the termination module according the present invention will now be described with reference to FIGS. 6a, 6b, and 6c. FIG. 6a is a perspective view of the termination module 630 in a closed position. FIG. 6b is a perspective view of the termination module 630 of FIG. 6a in a first open position showing a splice chamber 630b and trays 615. FIG. 6c is a perspective view of the termination module 630 of FIG. 6a in a second open position showing the backside of a termination panel 630a. The termination module 630 includes the termination panel 630a, a splice chamber 630b, and a mounting member 630c. The termination panel 630a and splice chamber 630b are each rotatably mounted to the mounting member 630c. A plurality of brackets 634 are positioned on the termination panel 630a so as to provide means for resting the termination module 630 on a table or other flat surface in the open position orientation of FIG. 6b or FIG. 6c to facilitate work on splices and the like by a technician setting up the termination module 630 while reducing the risk of damage to the interconnection members 620.

A movable cable securing member 682 is configured to receive, secure and/or provide strain relief for an optical fiber cable 105, 110. The moveable cable securing member 682 is illustrated in a first position aligned with a closed position of the termination panel 630a and a splice chamber 630b in FIG. 6a and a second position aligned with an open position of the termination panel 630a and splice chamber 630b in FIG. 6b. The moveable cable securing member 682 in FIGS. 6a, 6b and 6b is mounted so as to align with the splice chamber 630 and splice modules 615 in each position to reduce the risk of damage due to bending of the optical fiber cables 105, 110.

FIG. 6a illustrates an arrangement and orientation suitable for use when installed in an interconnect cabinet allowing access to the front side of the interconnection members 620. FIG. 6c illustrates allowing access to the backside 620' of the interconnect members 620. In contrast, FIG. 6b illustrates a position suitable for use during set up of the termination module 630 by a technician providing splices to fibers of the cables 105, 110 using the splice modules 615.

For the embodiments of the moveable cable securing member 682 illustrated in FIG. 6b, temporary brackets 686 may be provided to hold the cable securing member 682 in the second position aligned with the opened splice chamber 630b. As shown in FIG. 6b, an attachment member 688 is provided that is configured to receive and retain a strength member of an optical fiber cable 105, 110. For the illustrated embodiment, the attachment member 688 is a bolt, which may couple to a retaining member, such as a bracket or clamp, positioned on an opposite face of the cable securing member 682. In addition, further support may be provided by attaching the outer jacket of the cable 105, 110 with a hose clamp, twist tie or the like to the tie off tabs 684.

The illustrated cable securing member 682 in FIG. 6b includes two flat plate members, each of which may be configured to receive two cables 105, 110. It is to be understood that other attachment members may be provided using various securing or clamping devices suitable for securely grasping a strength member of a cable and that one or more such attachment members may be provided for use with each cable secured by the cable securing member 682.

As shown by FIG. 6b and FIG. 6c, the termination panel 630a and splice chamber 630b are pivotably mounted to the mounting member 630c for independent pivotal movement. The mounting member 630c is configured for mounting in an interconnect cabinet 200, 300, 400, 500 using for example, the mounting holes 631 illustrated in FIG. 6b.

Before opening the termination module 630 from the position of FIG. 6a to the position of FIG. 6b, the cable securing member 682 may be detached from the mounting member 630c. The termination panel 630a and splice chamber 630b may then be pivoted to the open position of FIG. 6b and the cable securing member 682 may be secured into the position shown in FIG. 6b using the brackets 686. When operations related to splicing and the like are completed, a technician may remove the cable securing member 688 and the brackets 686 and reattach the cable securing member 682 as shown in FIG. 6c to maintain an orientation aligned with the splice chamber 630b in the closed position of the splice chamber 630b relative to the mounting member 630c. In addition, FIG. 6a shows the front side of the interconnection members 620 accessible on the patch panel 632 while FIG. 6c shows access to the backside 620' of the interconnection members.

FIG. 6b shows additional details of the splice chamber 630b. In particular, the splice modules 615 are pivotally mounted to respective angle mounting brackets 617 to provide access to different ones of the stacked plurality of splitter modules 615. Before completing the splicing of individual fibers within the splitter modules 615, an excess length of respective optical fibers may be provided for future use and/or modification in the optical fiber slack receiving region 674. The optical fiber slack receiving region 674 illustrated in FIG. 6b is positioned between the splice modules 615 and the termination panel 630a.

Figure 7A:
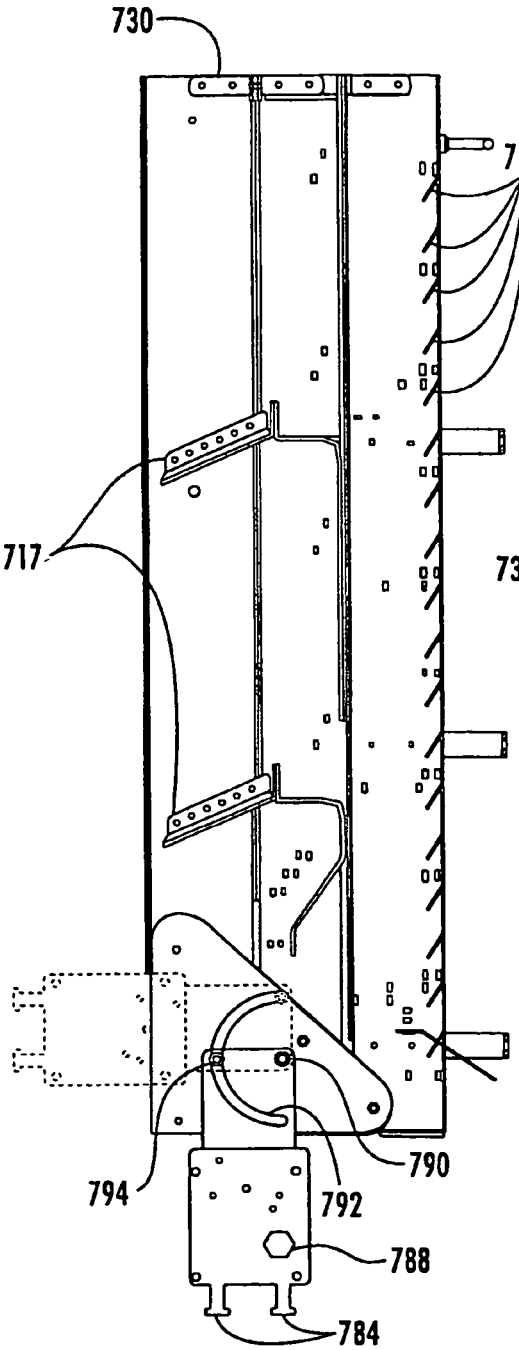
FIG. 7a is a side view of a termination module according to some embodiments of the present invention.
Figure 7B:
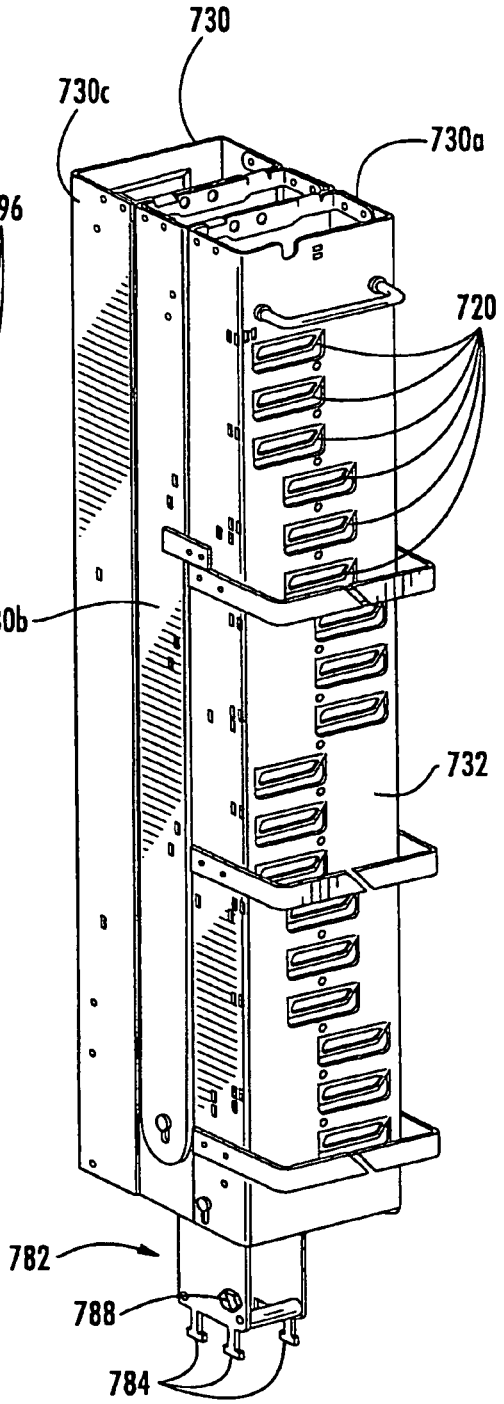
Figure 8:
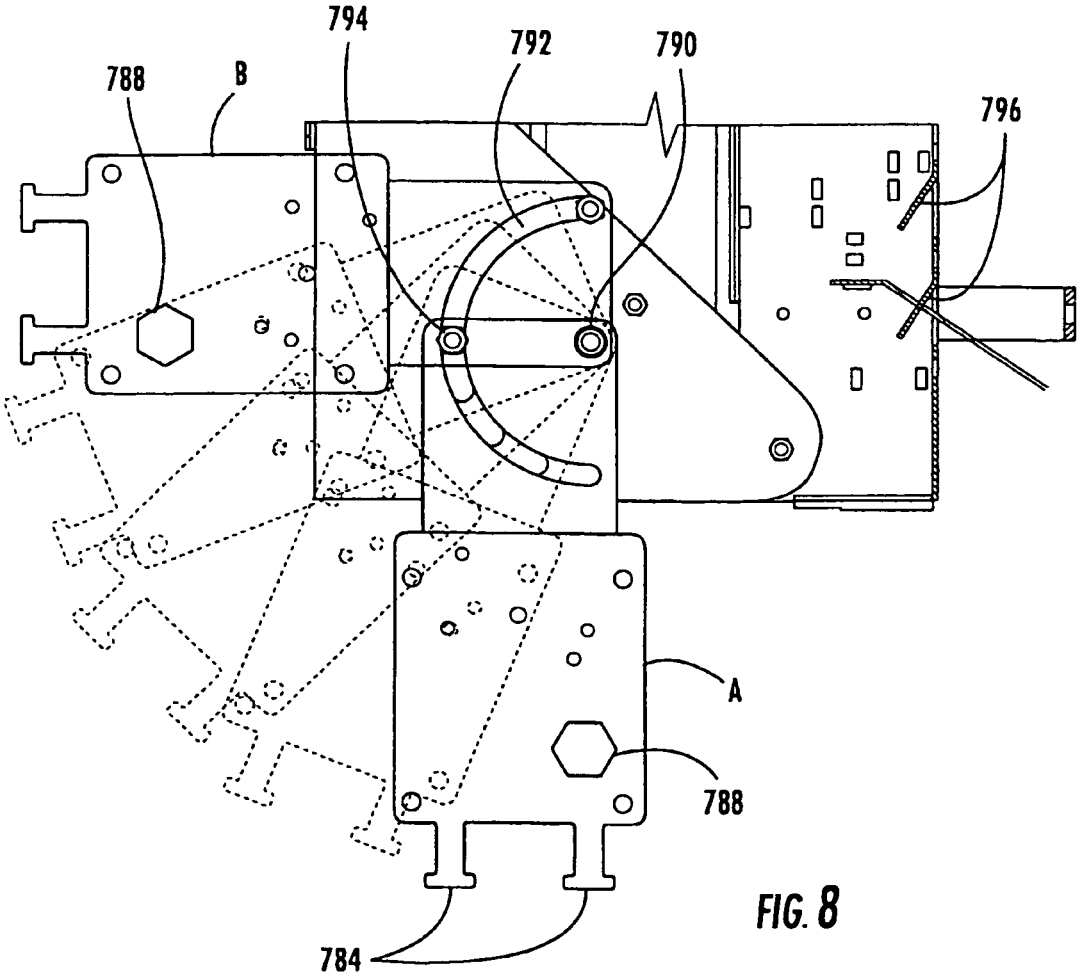
FIG. 8 is a side view of the cable securing member of the termination module of FIG. 7a according to some embodiments of the present invention.

FIG. 7a is a side view of a termination module 730 according to further embodiments of the present invention. FIG. 7b is a front perspective view of the termination module 730 of FIG. 7a. As shown in FIGS. 7a and 7b the termination module 730 includes a termination panel 730a, a splice chamber 730b and a mounting member 730c. A region for a plurality of interconnection members 720 are provided in the patch panel 732 defined by the front face of the termination panel 730. None of the interconnection points are mounted in the patch panel 732 as illustrated in FIG. 7b. However, as shown in FIG. 7a, the patch panel 732 includes angled strips 796 configured to receive a plurality of interconnection members. The downward angle orientation illustrated for the strips 796 may provide improved safety for the installer by reducing the risk of light being directly aimed at the installer's eyes and/or may provide reduced infiltration of dirt and the like to the interconnection members 720 due to gravity.

The arrangement for positioning of the interconnection members 720 in FIG. 7b differs from that described previously with reference to FIG. 6a primarily in the provision of a staggered alignment for rows of the interconnection members 720. Such an arrangement may provide for improved accessibility of the interconnection members 720, as the cascading of pigtails feeding to the interconnection members 720 may less heavily overlay lower position interconnection member rows in the patch panel 732. The embodiments of FIGS. 7b and 7b further illustrate angled mounting brackets 717 for use in pivotally mounting splice modules, such as optical splice trays, in a stacked relationship.

The embodiments of FIGS. 7a and 7b further differ from those described with reference to FIGS. 6a-6c in the particulars of the moveable cable securing member 782. As illustrated in the side view illustration of FIG. 8, the cable securing member 782 is pivotable between a first position A aligned with a closed position of the termination panel 730a and splice chamber 730b and a second position B aligned with an open position of the termination panel 730a and the splice chamber 730b. An attachment member 688 and tie-off tab 784 may be provided for securing a respective optical fiber cable as described previously with reference to the similarly numbered elements of FIGS. 6a-6c (684, 688). The cable securing member 688 is pivotally attached to the termination module 730 at a pivot point 790 to allow movement between the first position A and the second position B. The cable securing member 788 is configured, in some embodiments of the present invention, to pivot about a neutral axis having an arc length for a cable secured therein that is substantially the same in the first position A and the second position B to limit load on the cable secured therein during movement of the cable securing member 788 between the first position A and the second position B. A movement track 792 is provided including a securing member or bolt 794 for locking the cable securing member 782 in a desired position.

Figure 9:
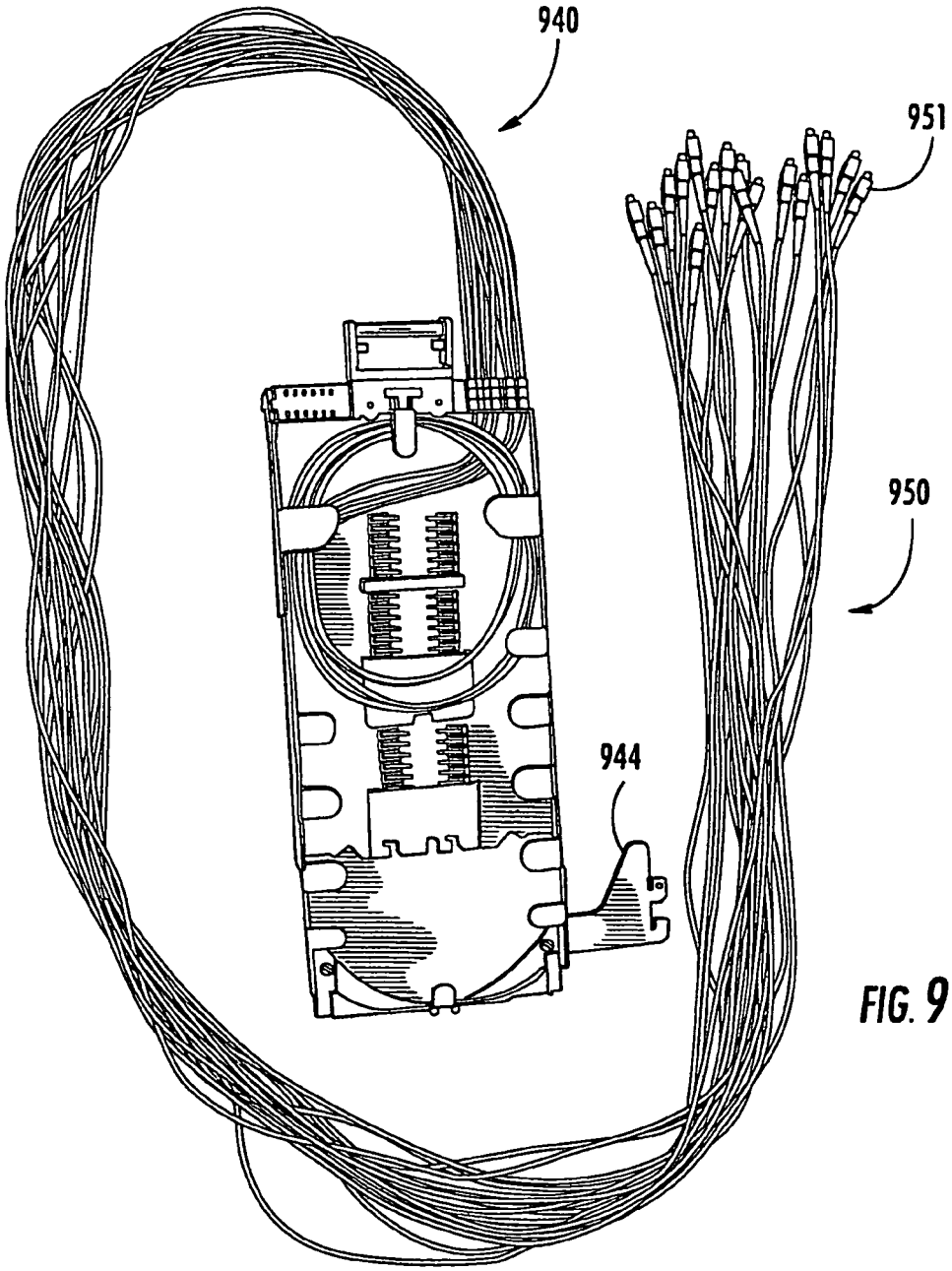
FIG. 9 is a perspective view of an optical fiber splitter/splice tray having a plurality of connectorized pigtails according to some embodiments of the present invention.
Figure 10:
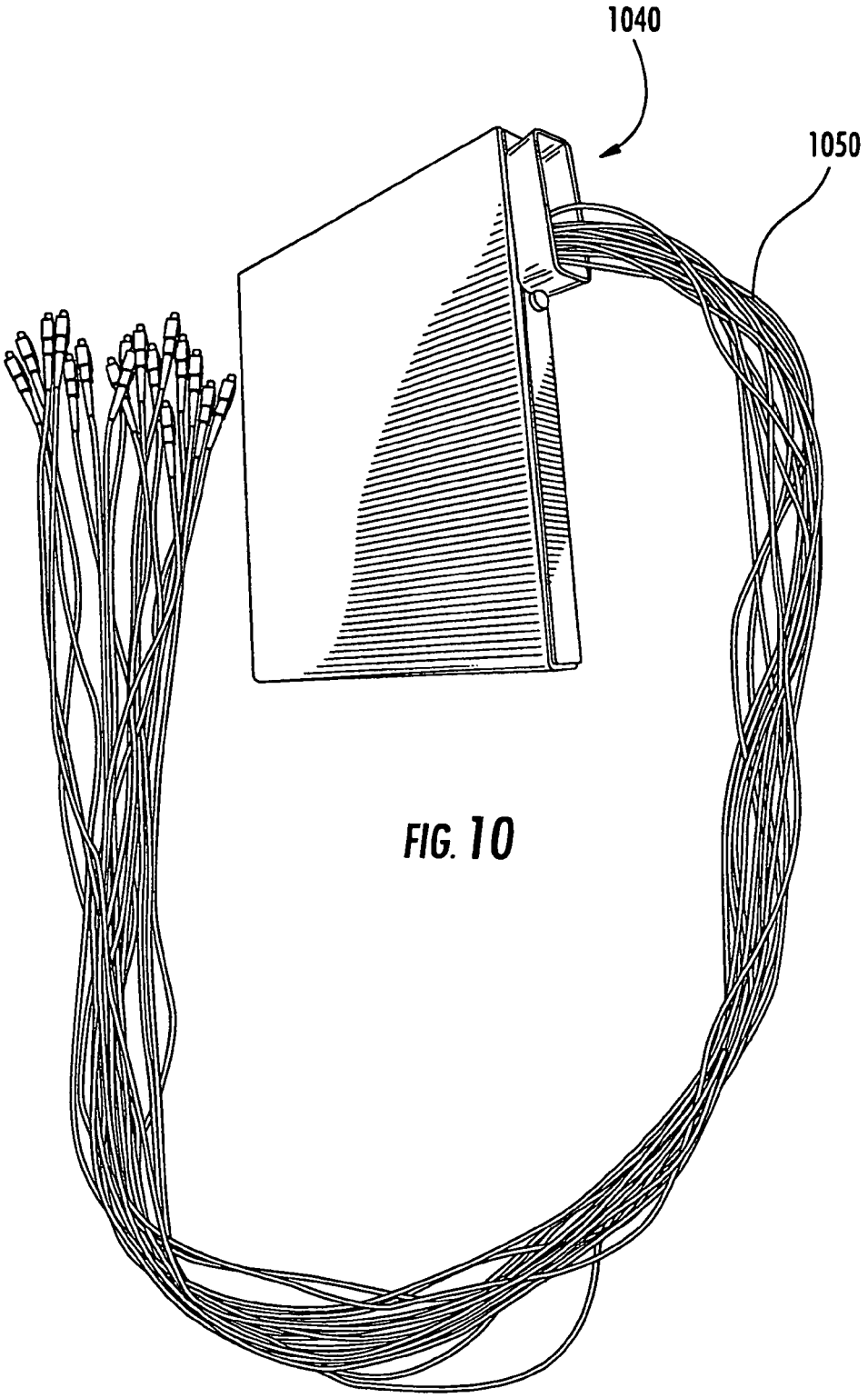
FIG. 10 is a perspective view of an optical fiber splitter/splice box having a plurality of connectorized pigtails according to some embodiments of the present invention.

FIG. 9 is a perspective view of an optical fiber splitter/splice tray 940 having a plurality of connectorized pigtails 950 according to some embodiments of the present invention. As shown in FIG. 9, a mounting bracket 944 is mounted at one end of the optical fiber splitter/splice tray 940 and the pigtails 950 extend from an opposite end thereof. Connector plugs 951 are provided at the ends of the connectorized pigtails 950. FIG. 10 is a perspective view illustrating an alternative optical splitter module arrangement using a splitter box 1040 having connectorized pigtails 1050 extending therefrom, rather than an optical fiber tray. The splitter box 1040, like the splitter tray 940, may be held in place in an interconnect cabinet by, for example, tabs and/or a bracket.

Figure 11:
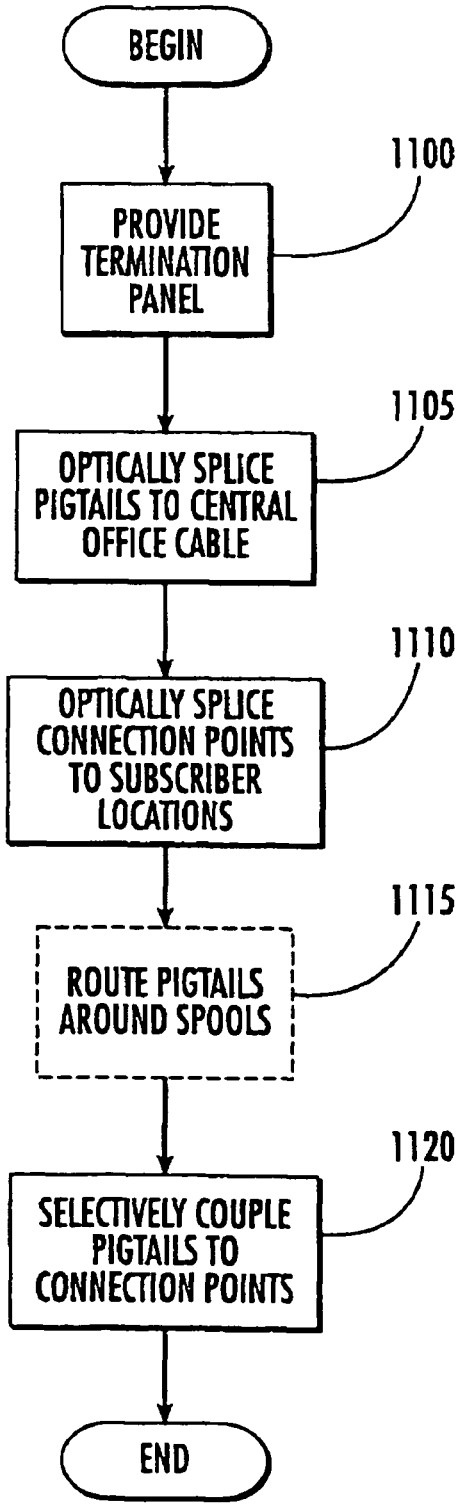
FIG. 11 is a flowchart illustrating methods for outside plant management of subscriber optical fiber connectivity according to some embodiments of the present invention.

Methods for outside plant management of subscriber optical fiber connectivity according to some embodiments of the present invention will now be described with reference to the flowchart illustration of FIG. 11. As shown in FIG. 11, operations begin at Block 1100 by providing a termination panel in an interconnect cabinet for optical fibers including a plurality of optical fiber connection points (connection members) and a splitter in the cabinet having a plurality of optic fiber connectorized pigtails extending therefrom. Such a termination panel, splitter and cabinet arrangement has been described previously with reference to FIGS. 1-10. The connectorized pigtails may have a cable length sufficient to allow connection to the plurality of connection points. The connectorized pigtails are optically spliced to an optical fiber feeder cable coupled to a central office (Block 1105). The plurality of optical fiber connection points (or connection members) are optically spliced to receptive subscriber locations (Block 1110). In some embodiments of methods according the present invention, ones of the connectorized pigtails are routed around selected ones of a plurality of fiber management spools based on a location of the connection points to which they are to be coupled (Block 1115). Ones of the connectorized pigtails are selectively coupled to ones of the connection points to provide service to the designated ones of the subscriber locations (Block 1120). Similarly, ones of the connectorized pigtails may be selectively decoupled from one of the connection points to terminate service for a designated one of the subscriber locations.

The block diagram of FIG. 1 and the flowchart of FIG. 11 illustrate the architecture, functionality, and operation of possible implementations of methods for outside plant management of subscriber optical fiber connectivity according to some embodiments of the present invention. It should be noted that, in some alternative implementations, the acts noted in the blocks may occur out of the order noted in the figures. For example, two blocks shown in succession may, in fact, be executed substantially concurrently, or the blocks may be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An interconnect cabinet for optical fibers, comprising:

an enclosure;

a splitter mounted in the enclosure that is configured to optically couple a plurality of *pigtail* optical fibers to [a single] *an input* optical fiber [and], *the splitter* having a plurality of [optical fiber] connectorized pigtails extending therefrom *with each of the connectorized pigtails including one of the pigtail optical fibers*, each of the connectorized pigtails having a first end optically coupled in the splitter to [an optical fiber feeder cable to be coupled to a central office] *the input optical fiber* and a second end having an optical connector thereon with [an optical fiber] *one of the pigtail optical fibers* extending from the first end to the second end;

a termination panel mounted in the enclosure and having a plurality of optical fiber connection members[, ones of which are associated with respective subscriber locations]; [and]

wherein the connectorized pigtails have a cable length from the first end to the second end, without a connector therebetween, sufficient to allow connection to the plurality of connection members and wherein the termination panel is pivotally mounted in the enclosure to allow access to a front and a back side of the connection members from a front side of the enclosure*; and*

*wherein the cabinet includes a first pigtail routing path within the enclosure that extends from the splitter to the termination panel and a second pigtail routing path within the enclosure that extends from the splitter to a pigtail storage location for storing unused ones of the connectorized pigtails, the pigtail storage location being separate from the termination panel.*

2. The cabinet of claim 1 wherein [the optical fiber feeder cable comprises at least one input optical fiber and wherein the splitter optically couples the at least one input optical fiber to the plurality of connectorized pigtails] *the input optical fiber is optically connected to an optical fiber feeder cable* and wherein the plurality of connectorized pigtails have substantially the same length.

3. The cabinet of claim 2 further comprising [an optical fiber cable from the central office coupled to the at least one input optical fiber and] optical fiber cables from [the] subscriber locations coupled to the plurality of connection members.

4. The cabinet of claim 2 wherein the splitter comprises an optical fiber splitter tray and wherein the enclosure is configured to receive a plurality of optical fiber splitter trays.

5. The cabinet of claim 4 wherein the enclosure is configured to receive a plurality of termination panels.

6. The cabinet of claim 2, wherein [the splitter is configured to splice the at least one input optical fiber to the plurality of connectorized pigtails] *the optical fiber feeder cable is routed from a central office.*

7. The cabinet of claim 1 wherein the termination panel comprises a front panel of a termination module and wherein the termination module further comprises a splice module positioned in the cabinet proximate the termination panel.

8. The cabinet of claim 1 wherein the enclosure is configured to receive a plurality of termination modules and a plurality of splitters.

9. The cabinet of claim 1, wherein the *pigtail* optical fibers in the connectorized pigtails extend continuously without any splicing therein from the first end to the second end.

10. The cabinet of claim 1, wherein ones of the connectorized pigtails are coupled to corresponding respective ones of the connection members on the termination panel without a jumper cable therebetween.

11. The cabinet of claim 1 further comprising a spooling system mounted in the enclosure and configured to receive and store excess cable length of the plurality of connectorized pigtails.

12. The cabinet of claim 11 wherein the spooling system comprises a plurality of spools displaced from each other in the enclosure by a distance corresponding to a distance between a first and last row of connection members on the termination panel.

13. The cabinet of claim 11 wherein a distance between a first and a last of the spools is about half the distance between first and last rows of connection members on the termination panel.

14. The cabinet of claim 13 wherein the spooling system further comprises an initial loop spool configured to receive all the connectorized pigtails and provide the connectorized pigtails a common entry point to the spooling system.

15. The cabinet of claim 13 wherein the spools comprise half-moon spools.

16. The cabinet of claim 11 wherein the plurality of connectorized pigtails have substantially the same length.

17. An interconnect cabinet, comprising:

an enclosure;

a termination panel mounted in the enclosure and having a plurality of optical fiber connection members, ones of which are associated with respective subscriber locations or are associated with an optical fiber feeder cable to be coupled to a central office;

at least one jumper cable for cross-connecting ones of the connection members; and a spooling system mounted in the enclosure and configured to receive and store excess cable length of the at least one jumper cable;

wherein the at least one jumper cable has a cable length sufficient to allow cross-connecting of the plurality of connection members; and wherein a distance between a first and a last of the spools is about half the distance between first and last rows of connection members on the termination panel.

18. The cabinet of claim 17, wherein the termination panel includes a plurality of regions, each including a plurality of the rows of the connection members and wherein each of the plurality of spools is associated with a respective one of the regions of the termination panel and wherein a distance between adjacent ones of the plurality of spools corresponds to a distance between a first and last row of the connection members on the respective one of the regions of the termination panel.

*19. The cabinet of claim 1, wherein the first pigtail routing path extends in a first direction toward the termination panel, wherein the second pigtail routing path extends in a second direction toward the pigtail storage location, and wherein the first direction is opposite with respect to the second direction.*

*20. The cabinet of claim 1, wherein the first and second sides of the connection members comprise front and back sides of the connection members, and wherein the first side of the enclosure comprises a front side of the enclosure.*

*21. An interconnect cabinet for optical fibers, comprising:*

*an enclosure;*

*a splitter mounted in the enclosure that is configured to optically couple a plurality of pigtail optical fibers to an input optical fiber, the splitter having a plurality of connectorized pigtails extending therefrom with each of the connectorized pigtails including one of the pigtail optical fibers, each of the connectorized pigtails having a first end optically coupled in the splitter to the input optical fiber and a second end having an optical connector thereon with one of the pigtail optical fibers extending from the first end to the second end;*

*a termination support structure mounted in the enclosure and having a plurality of optical fiber connection members mounted thereon;*

*wherein the connectorized pigtails have a cable length from the first end to the second end, without a connector therebetween, sufficient to allow connection to the plurality of connection members and wherein the termination support structure is pivotally mounted in the enclosure to allow access to first and second opposite sides of the connection members from a first side of the enclosure; and*

*wherein the splitter includes a splitter module having an outer housing and a pigtail exit member that projects outwardly with respect to the outer housing, and wherein the plurality of connectorized pigtails exit the outer housing through the pigtail exit member.*

* * * * *